(12) United States Patent
Jung et al.

(10) Patent No.: US 10,884,760 B2
(45) Date of Patent: Jan. 5, 2021

(54) APPARATUS AND METHOD FOR MANAGING APPLICATION PROGRAM

(71) Applicant: SAMSUNG ELECTRONICS CO., LTD., Suwon-si (KR)

(72) Inventors: Hyunjoo Jung, Suwon-si (KR); Jaedeok Kim, Suwon-si (KR); Chiyoun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/678,548

(22) Filed: Nov. 8, 2019

(65) Prior Publication Data

US 2020/0218543 A1 Jul. 9, 2020

(30) Foreign Application Priority Data

Jan. 3, 2019 (KR) .................. 10-2019-0000861

(51) Int. Cl.
*G06F 9/445* (2018.01)
*G06N 3/04* (2006.01)
*G06N 20/10* (2019.01)
*G06N 20/20* (2019.01)
*G06N 3/08* (2006.01)

(52) U.S. Cl.
CPC ........... *G06F 9/445* (2013.01); *G06N 3/0454* (2013.01); *G06N 3/08* (2013.01); *G06N 20/10* (2019.01); *G06N 20/20* (2019.01)

(58) Field of Classification Search
CPC ........ G06N 3/0454; G06N 3/08; G06N 20/20; G06F 9/445
See application file for complete search history.

(56) References Cited

U.S. PATENT DOCUMENTS

| | | | |
|---|---|---|---|
| 5,375,241 A | 12/1994 | Walsh | |
| 5,611,020 A * | 3/1997 | Bigus | G06N 3/04 706/25 |
| 5,613,043 A | 3/1997 | Bigus | |
| 5,901,314 A | 5/1999 | Boehme et al. | |
| 9,443,192 B1 * | 9/2016 | Cosic | G06N 3/02 |
| 10,235,625 B1 * | 3/2019 | Walters | G06N 3/04 |
| 10,546,231 B2 * | 1/2020 | Bazrafkan | G06N 3/082 |
| 2013/0066925 A1 | 3/2013 | Szyperski et al. | |

(Continued)

FOREIGN PATENT DOCUMENTS

EP 3389005 A1 * 10/2018 ............... G06T 1/20
KR 10-1377601 B1 3/2014

OTHER PUBLICATIONS

"Understand the Smart Home Skill API", Alexa Skills Kit, https://developer.amazon.com/docs/smarthome/understand-the-smart-home-skill-api.html, accessed Nov. 7, 2019, 7 pages.

(Continued)

*Primary Examiner* — Alexey Shmatov
*Assistant Examiner* — Beatriz Ramirez Bravo
(74) *Attorney, Agent, or Firm* — Sughrue Mion, PLLC

(57) ABSTRACT

Provided is an apparatus configured to determine a common neural network based on a comparison between a first neural network included in a first application program and a second neural network included in a second application program, utilize the common neural network when the first application program or the second application program is executed.

18 Claims, 18 Drawing Sheets

(56) References Cited

U.S. PATENT DOCUMENTS

| | | | |
|---|---|---|---|
| 2015/0154495 A1* | 6/2015 | Qiu | G06N 5/048 |
| | | | 706/14 |
| 2017/0140273 A1* | 5/2017 | Sagher | G06N 3/0454 |
| 2017/0330069 A1* | 11/2017 | Liu | G06N 3/04 |
| 2018/0088996 A1* | 3/2018 | Rossi | G06F 9/5016 |
| 2018/0157972 A1 | 6/2018 | Hu et al. | |
| 2019/0012592 A1* | 1/2019 | Beser | G06F 8/65 |
| 2019/0065944 A1* | 2/2019 | Hotson | G06N 3/084 |
| 2019/0180187 A1* | 6/2019 | Rawal | G06N 3/0454 |
| 2019/0207814 A1* | 7/2019 | Jain | G16H 20/00 |
| 2019/0244091 A1* | 8/2019 | Weber | G06N 3/04 |
| 2019/0294999 A1* | 9/2019 | Guttmann | G06K 9/6219 |
| 2019/0385043 A1* | 12/2019 | Choudhary | G06N 7/00 |

OTHER PUBLICATIONS

Stephen Charles Ashmore "Evaluating the Intrinsic Similarity between Neural Networks" Northeastern State University Bachelor of Science in Computer Science, Dec. 2015. (44 pages total).
International Search Report and Written Opinion (PCT/ISA/210 and PCT/ISA/237), dated Feb. 27, 2020 by International Searching Authority in International Application No. PCT/KR2019/015805.

\* cited by examiner

APPARATUS AND METHOD FOR MANAGING APPLICATION PROGRAM

CROSS-REFERENCE TO RELATED APPLICATION

This application is based on and claims priority under 35 U.S.C. § 119 to Korean Patent Application No. 10-2019-0000861, filed on Jan. 3, 2019, in the Korean Intellectual Property Office, the disclosure of which is incorporated by reference herein in its entirety.

BACKGROUND

1. Field

The disclosure relates to the field of data management. More particularly, the disclosure relates to an apparatus and method for managing storage, execution, etc. of an application program in a device on which various types of application programs are installed.

2. Description of Related Art

With the development of mobile devices such as smartphones, types of application programs have increased exponentially. Users may install the various types of application programs for providing various corresponding services on their smartphones.

When many application programs are installed on a device, storage capacity of an auxiliary storage device and a main storage device of the device may be consumed. Although a common module for providing a similar function may exist in application programs for providing different services, all of the application programs are individually installed on and stored in the device, which may unnecessarily waste of the storage capacity of the auxiliary storage device and the main storage device.

SUMMARY

An objective of an apparatus and method for managing an application program, according to an embodiment of the disclosure, is to reduce a data size of the application program stored in a device.

Also, an objective of an apparatus and method for managing an application program, according to an embodiment of the disclosure, is to reduce a size of data loaded into a main storage device to execute the application program.

Additional aspects will be set forth in part in the description which follows and, in part, will be apparent from the description, or may be learned by practice of the presented embodiments of the disclosure According to an embodiment of the disclosure, there is provided an apparatus for managing an application program including a memory and a central processing device, the central processing device configured to: compare a first neural network of a first application program installed on the apparatus and a second neural network of a second application program installed on the apparatus; determine a common neural network that structurally corresponds to the first neural network and the second neural network based on a result of comparing the first neural network and the second neural network; store the common neural network in the memory; and when the first application program or the second application program is executed, load the common neural network and utilize the common neural network to process data of the first application program or the second application program.

The apparatus may further include an auxiliary storage device storing first files constituting the first application program, second files constituting the second application program, and one or more files corresponding to the common neural network.

The central processing device may be further configured to generate mapping information indicating the first application program and the second application program using the common neural network and store the mapping information in the auxiliary storage device.

The central processing device may be further configured to: ob obtain first structure information of the first neural network from a first metafile included in the first application program; obtain second structure information of the second neural network from a second metafile included in the second application program; and determine the common neural network by comparing the first structure information of the first neural network with the second structure information of the second neural network.

The first structure information may include first types of first layers included in the first neural network and first connection relations between the first layers, and the second structure information may include second types of second layers included in the second neural network and second connection relations between the second layers.

The first structure information may include first sizes of first input data and first output data of the first layers included in the first neural network, and the second structure information may include second sizes of second input data and second output data of the second layers included in the second neural network.

The first structure information may include first numbers of nodes per layer included in first fully connected layers of the first neural network and the second structure information may include second numbers of nodes per layer included in second fully connected layers of the second neural network.

The first structure information may include first convolution layers and first numbers of first filter kernels of the first neural network, first sizes of the first filter kernels of the first neural network, and first strides of the first convolution layers of the first neural network and the second structure information may include second convolution layers and second numbers of second filter kernels of the second neural network, second sizes of the second filter kernels of the second neural network, and second strides of the second convolution layers of the second neural network.

The first structure information may include first pooling layers and first sizes of first filter kernels of the first neural network and first strides of the first pooling layers of the first neural network and the second structure information may include second pooling layers and second sizes of second filter kernels of the second neural network and second strides of the second pooling layers of the second neural network.

The central processing device may be further configured to: store a first internal parameter used to process input data in the first neural network as a common parameter in the auxiliary storage device; determine that the common parameter is not the same as a second internal parameter used to process input data in the second neural network; determine difference information between the common parameter and the second internal parameter; and store the difference information in the auxiliary storage device.

The central processing device may be further configured to restore the second internal parameter, determine at least one of a residual parameter added to the common parameter, a transformation parameter multiplied by the common parameter, or a selective parameter for selecting a part of the common parameter as the difference information.

The central processing device may be further configured to: determine a plurality of pieces of difference information between the common parameter and the second internal parameter according to a plurality of calculation methods; and store difference information having a smallest data size from among the plurality of pieces of difference information in the auxiliary storage device.

The central processing device may be further configured to: store a first internal parameter used to process input data in the first neural network as a common parameter in the auxiliary storage device; determine that the common parameter is not the same as a second internal parameter used to process input data in the second neural network; determine difference information between the common parameter and the second internal parameter; and determine whether to store the difference information in the auxiliary storage device, based on a result obtained by comparing a size of the difference information with a size of the second internal parameter.

The central processing device may be further configured to: when an application utilizing the second neural network is executed, restore the second internal parameter from the common parameter based on the difference information; and load the second internal parameter into the memory.

The central processing device may be further configured to: obtain update data related to the first neural network of the first application program; obtain a neural network corresponding to the update data; determine that the neural network and the common neural network do not structurally correspond to each other; and store the neural network as an individual neural network of the first application program in the auxiliary storage device.

The central processing device may be further configured to, determine that the neural network and the common neural network structurally correspond to each other, determine a common parameter and an internal parameter obtained based on the update data are not the same, and store difference information between the common parameter and the internal parameter in the auxiliary storage device.

The central processing device may be further configured to, when the neural network and the common neural network structurally correspond to each other, not store the neural network in the auxiliary storage device.

According to an embodiment of the disclosure, there is provided an apparatus for managing an application program including a memory and a central processing device, the central processing device configured to: compare first layers of a first neural network included in a first application program installed on the apparatus and second layers of a second neural network included in a second application program installed on the apparatus; determine a common neural network that structurally corresponds to the first neural network and the second neural network based on a result of comparing the first layers of the first neural network and the second layers of the second neural network; store the common neural network in the memory; and when the first application program or the second application program is executed, load the common neural network and utilize the common neural network to process data of the first application program or the second application program.

According to another embodiment of the disclosure, there is provided a method, performed by an apparatus for managing an application program, of managing an application program including: comparing a first neural network included in a first application program installed on the apparatus and a second neural network included in a second application program installed on the apparatus; determining a common neural network that structurally corresponds to the first neural network and the second neural network based on a result of the comparing; storing the common neural network in memory; and when the first application program or the second application program is executed, loading the common neural network and utilizing the common neural network to process data of the first application program or the second application program.

BRIEF DESCRIPTION OF THE DRAWINGS

A brief description of each drawing is provided to more fully understand the drawing recited in the present specification.

The above and other aspects, features, and advantages of certain embodiments of the disclosure will be more apparent from the following description taken in conjunction with the accompanying drawings, in which.

DETAILED DESCRIPTION

Figure 1:
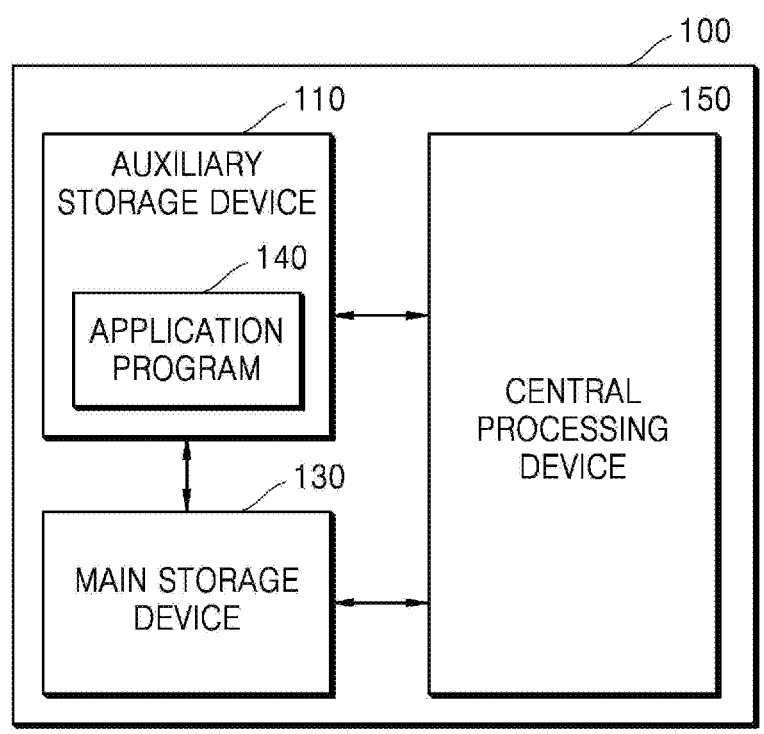
FIG. 1 is a block diagram illustrating a configuration of an apparatus for managing an application program, according to an embodiment of the disclosure.

As the disclosure allows for various changes and numerous embodiments thereof, embodiments of the disclosure will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when such explanation is deemed to unnecessarily obscure the essence of the disclosure. Also, numbers (e.g., first and second) used in the description of embodiments of the disclosure are intended to merely distinguish one component from another.

When a component is referred to as being "connected" or "accessed" to or by any other component, it should be understood that the component may be directly connected or accessed to or by the other component, but another new component may also be interposed between them, unless otherwise specifically indicated.

Regarding an element with a suffix such as 'unit' or 'module,' two or more elements may be combined into one element or one element may be divided into two or more elements according to functions. In addition, each of respective components to be described below may additionally perform some or all functions among functions which other components take charge of in addition to a primary function which each component takes charge of and some functions among primary functions which the respective components take charge of may be exclusively performed by other components.

Throughout the disclosure, the expression "at least one of a, b or c" indicates only a, only b, only c, both a and b, both a and c, both b and c, all of a, b, and c, or variations thereof.

Also, in the specification, when 'A (e.g., a file, a neural network, or an internal parameter) is stored in an auxiliary storage device,' it may mean that A that is not stored in the auxiliary storage device is newly stored in the auxiliary storage device or may mean that a state in which A is already stored in the auxiliary storage device is maintained. Also, when 'A is not stored in an auxiliary storage device,' it may mean that A that is not stored in the auxiliary storage device is not stored in the auxiliary storage device or may mean that A that is already stored in the auxiliary storage device is removed from the auxiliary storage device.

Also, the term 'application program' used herein refers to a program designed to perform a specific function and may include any of various types of programs installed on a computer, a smartphone, etc. Examples of the 'application program' may include a smartphone application, a personal computer (PC) application, a set-top box (STB) application, a web application, an instant application, and a vehicle application.

Embodiments of the disclosure will now be described in detail.

FIG. 1 is a block diagram illustrating a configuration of an apparatus 100 for managing an application program according to an embodiment of the disclosure.

The apparatus 100 may be any of various devices. For example, the apparatus 100 may be any of various devices for installing and executing an application program such as a desktop PC, a notebook, a tablet PC, a smartphone, a wearable device, a navigation device, a vehicle, or a TV.

Referring to FIG. 1, the apparatus 100 may include an auxiliary storage device 110, a main storage device 130, and a central processing device 150.

The auxiliary storage device 110 stores at least one application program 140. Examples of the auxiliary storage device 110 used to supplement the limited capacity of the main storage device 130 may include, but are not limited to, a hard disk drive (HDD), a solid-state drive (SSD), a universal serial bus (USB), a floppy disk, a magnetic tape, and an optical disc (e.g., a compact disc (CD), a digital versatile disc (DVD), or a Blu-ray). The application program 140 stored in the auxiliary storage device 110 may include a program designed to realize artificial intelligence (AI) technology. The application program 140 may include a neural network and an internal parameter, may process data input to the neural network according to the internal parameter, and may output a processed result.

The main storage device 130 loads data necessary to execute an application program 140 under the control of the central processing device 150. Examples of the main storage device 130 may include, but are not limited to, a read-only memory (ROM), a masked ROM, a programmable read-only memory (PROM), an erasable programmable read-only memory (EPROM), a random-access memory (RAM), a dynamic random-access memory (DRAM), and a static random-access memory (SRAM).

The central processing device 150 controls operations of the auxiliary storage device 110 and the main storage device 130. The central processing device 150 may include at least one of a central processing unit (CPU), a graphics processing unit (GPU), or a processor for artificial intelligence (AI).

The central processing device 150 may determine a common neural network and a common parameter from application programs installed on the auxiliary storage device 110, may obtain difference information between internal parameters, and may store the difference information in the auxiliary storage device 110. Also, the central processing device 150 may reduce a size of an application program stored in the auxiliary storage device 110 by not storing some of files constituting the application program in the auxiliary storage device 110. Also, the central processing device 150 may reduce a size of data loaded into the main storage device 130 by loading a common neural network and a common parameter shared by multiple application programs to the main storage device 130.

Figure 2:
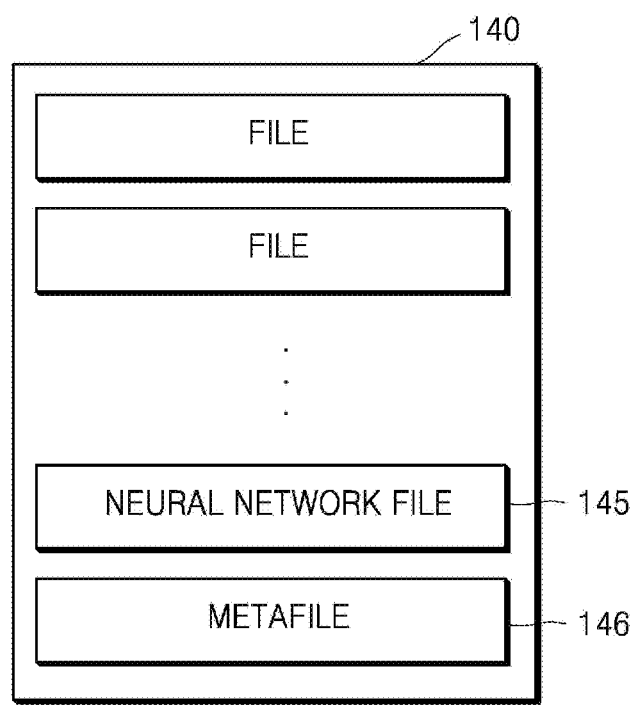
FIG. 2 is a block diagram illustrating files constituting an application program stored in an auxiliary storage device.

FIG. 2 is a block diagram illustrating files constituting an application program 140 stored in the auxiliary storage device 110, and the application program 140 includes a plurality of files. The files may include various types of files necessary to execute the application program 140 such as an executable file, a source file, a binary file, a database file, an image file, and a video file. The apparatus 100 according to the disclosure may optimize the storage capacity of the auxiliary storage device 110 and the main storage device 130 by using the application program 140 including a neural network file 145.

The neural network file 145 is a file implementing a neural network that is machine-learned, and the neural network includes at least one layer, and receives input data, processes the input data according to an internal parameter, and then provides output data as a result of the processing. When a neural network is stored, the neural network file that is a file implementing the neural network is stored in memory, and when a neural network is removed, the neural network file that is a file implementing the neural network is removed from memory.

A neural network may be a network for realizing AI technology. As an application program to which AI technology is applied is used, the recognition rate of the AI technology improves and more accurately understands a user's taste. Thus, AI technology may replace a rule-based smart system with a deep learning-based AI program.

AI technology includes machine learning (e.g., deep learning) and element technologies that use machine learning. Machine learning is an algorithm technology that self-classifies and learns characteristics of input data, and element technologies are technologies using a machine learning algorithm such as deep learning to simulate functions of the human brain such as recognition and decision-making, and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, questions and answering, and speech recognition/synthesis. Visual understanding is a technology for recognizing and processing objects in the manner of a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification) and knowledge management (e.g., data utilization). Motion control is a technology for controlling self-driving of autonomous vehicles and the motion of robots and includes movement control (e.g., navigation, collision avoidance, or driving) and manipulation control (e.g., behavior control).

In FIG. 2, the application program 140 may include a metafile 146, and the metafile 146 may include information related to the neural network. For example, the metafile 146 may include information about a type of at least one layer constituting the neural network, an operation method, etc. As described below, the central processing device 150 may determine whether to extract a common neural network by using the metafile 146.

Internal parameters that are values used in an operation of each of the at least one layer constituting the neural network may include, for example, a weight value used to apply an input value to an arithmetic operation and/or a mapping value (e.g., an embedding matrix of a word embedding) between the input value and an output value. Also, the internal parameters may include a weight matrix and/or a mapping value matrix. The internal parameters are values to be trained, and the neural network may optimize the internal parameters based on training data. In an embodiment of the disclosure, the internal parameters may be stored in the neural network file 145, or may be included as the metafile 146 or a separate parameter file in the application program 140.

A method of managing an application program of the apparatus 100 will now be described in detail with reference to FIG. 3.

In operation S310, the central processing device 150 determines whether a first neural network of a first application program and a second neural network of a second application program structurally correspond to each other. When the first neural network and the second neural network structurally correspond to each other, it may mean that types of layers constituting the neural networks and/or connection relations between the layers correspond to each other.

After an installation file is transmitted from an application distribution server to the apparatus 100, the first application program and/or the second application program may be installed on the apparatus 100 by executing the installation file. Alternatively, after an installation file is transmitted to the apparatus 100 through a USB or the like, the first application program and/or the second application program may be installed on the apparatus 100 by executing the installation file.

The first application program may be first installed and then the second application program may be installed, or the second application program may be first installed and then the first application program may be installed.

The central processing device 150 may determine whether the first neural network and the second neural network structurally correspond to each other based on the types of the layers constituting the neural networks and the connection relations, and a specific determination method will be described in detail with reference to FIGS. 4 through 10.

When the first neural network and the second neural network structurally correspond to each other in operation S320—YES, in operation S330, the central processing device 150 may store files, other than the second neural network, from among files constituting the second application program in the auxiliary storage device 110. The central processing device 150 may not store a second neural network file from among the files constituting the second application program in the auxiliary storage device 110. In an embodiment of the disclosure, when a second internal parameter of the second neural network is stored in the second neural network file, the second internal parameter is not the same as a first internal parameter of the first neural network as described with reference to FIGS. 11 and 12, and storage of difference information is unnecessary, the central processing device 150 may not store the second neural network file in the auxiliary storage device 110 and may store the second internal parameter stored in the second neural network file as a separate file in the auxiliary storage device 110.

In operation S340, the central processing device 150 may store files constituting the first application program in the auxiliary storage device 110, and may store the first neural network as a common neural network in the auxiliary storage device 110.

Figure 3:
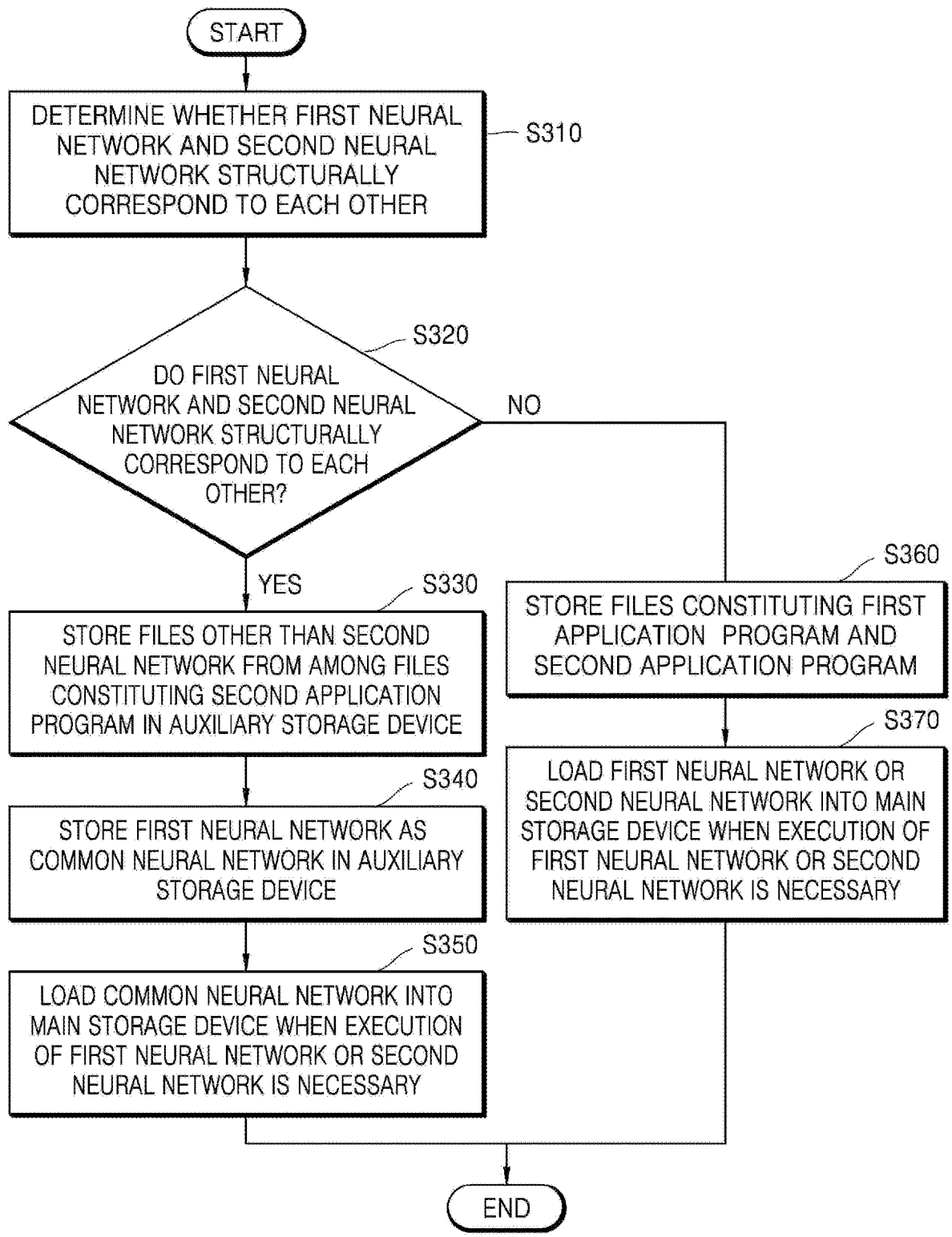
FIG. 3 is a flowchart for describing a method of managing an application program, according to an embodiment of the disclosure.

Although operation S340 is performed after operation S330 in FIG. 3, this is merely an example, and operation S340 and operation S330 may be performed at the same time or operation S340 may be performed before operation S330.

In operation S350, when the first application program or the second application program is executed and execution of the first neural network or the second neural network is necessary, the central processing device 150 may load the common neural network (i.e., the first neural network) into the main storage device 130, and then may execute first application or the second application to utilize the common neural network. The central processing device 150 may provide input data to the common neural network loaded into the main storage device 130, and may obtain output data that is output as a result of processing the input data from the common neural network. For example, when the first application program is executed, the central processing device 150 may provide input data (e.g., a photograph) obtained according to execution of a predetermined function (e.g., a photographing function or a photograph selecting function) of the first application program (e.g., a photographing application to capture a photograph) as the input data to the common neural network, and may obtain output data as a result of processing the input data from the common neural network. The central processing device 150 may use the data output from the common neural network as input data for executing a predetermined function (e.g., a display function) of the first application program.

In an embodiment of the disclosure, when the first application program is executed, the common neural network is located to the main storage device 130, and then the first application program ends, the central processing device 150 may unload the common neural network from the main storage device 130. However, when the first application program ends, but the second application program using the common neural network is being executed, the central processing device 150 may cause the common neural network to remain loaded into the main storage device 130.

In an embodiment of the disclosure, when the first neural network is stored as the common neural network and then a third application program including a third neural network is installed on the apparatus 100, the central processing device 150 may determine whether the common neural network and the third neural network structurally correspond to each other. When the common neural network and the third neural network structurally correspond to each other, the central processing device 150 may store only files, other than the third neural network, from among files constituting the third application program, and then may load the common neural network into the main storage device 130 when execution of the third neural network is necessary, or may execute the common neural network that is pre-loaded.

When the first neural network and the second neural network do not structurally correspond to each other in operation S320—NO, in operation S360, the central processing device 150 stores files constituting the first application program and the second application program in the auxiliary storage device 110. When the first neural network and the second neural network do not structurally correspond to each other, because a common neural network may not be provided, all of the files constituting the first application program and the second application program are stored in the auxiliary storage device 110.

In operation S370, when the first application program or the second application program is executed and execution of the first neural network or the second neural network is necessary, the central processing device 150 may load the first neural network or the second neural network into the main storage device 130.

Next, when the third application program including the third neural network is installed on the apparatus 100, the apparatus 100 may determine whether to extract a common neural network based on structures of the first neural network and the third neural network as described above, and may determine whether to extract a common neural network based on structures of the second neural network and the third neural network. A method of determining whether to extract the common neural network based on the structures of the first neural network and the third neural network and a method of determining whether to extract the common neural network based on the structures of the second neural network and the third neural network are the same as that described with reference to FIG. 3, and thus a redundant explanation thereof is omitted.

When the first neural network and the third neural network structurally correspond to each other, the first neural network may be determined as the common neural network, and then when execution of the first neural network and/or the third neural network is necessary, the central processing device 150 may load the common neural network into the main storage device 130. Alternatively, when the first neural network and the third neural network structurally correspond to each other, the third neural network may be determined as the common neural network. Still further, when the first neural network and the third neural network structurally correspond to each other, a neural network that is generic to the features and characteristics, such as those indicated by the metafile 146 of the first neural network and the third neural network, of the first neural network and the third neural network may be determined as the common neural network. Also, when the second neural network and the third neural network structurally correspond to each other, the second neural network may be determined as the common neural network, and then when execution of the second neural network and/or the third neural network is necessary, the central processing device 150 may load the common neural network into the main storage device 130.

According to an embodiment of the disclosure, when there exist multiple neural networks that structurally correspond to one another, one neural network from among the multiple neural networks is stored as a common neural network in the auxiliary storage device 110, and remaining neural networks are not stored in the auxiliary storage device 10 and thus do not reduce an available storage capacity of the auxiliary storage device 110. Also, in an embodiment of the disclosure, when multiple application programs including multiple neural networks that structurally correspond to one another are simultaneously executed, because only one common neural network may be loaded into the main storage device 130, a load on the main storage device 130 which occurs when the multiple neural networks are simultaneously loaded into the main storage device 130 may be reduced.

Determining whether neural networks structurally correspond to one another will now be described with reference to FIGS. 4 through 10.

In an embodiment of the disclosure, when types of layers included in a first neural network and a second neural network and connection relations between the layers are the same, the central processing device 150 may determine that the first neural network and the second neural network structurally correspond to each other.

Figure 4:
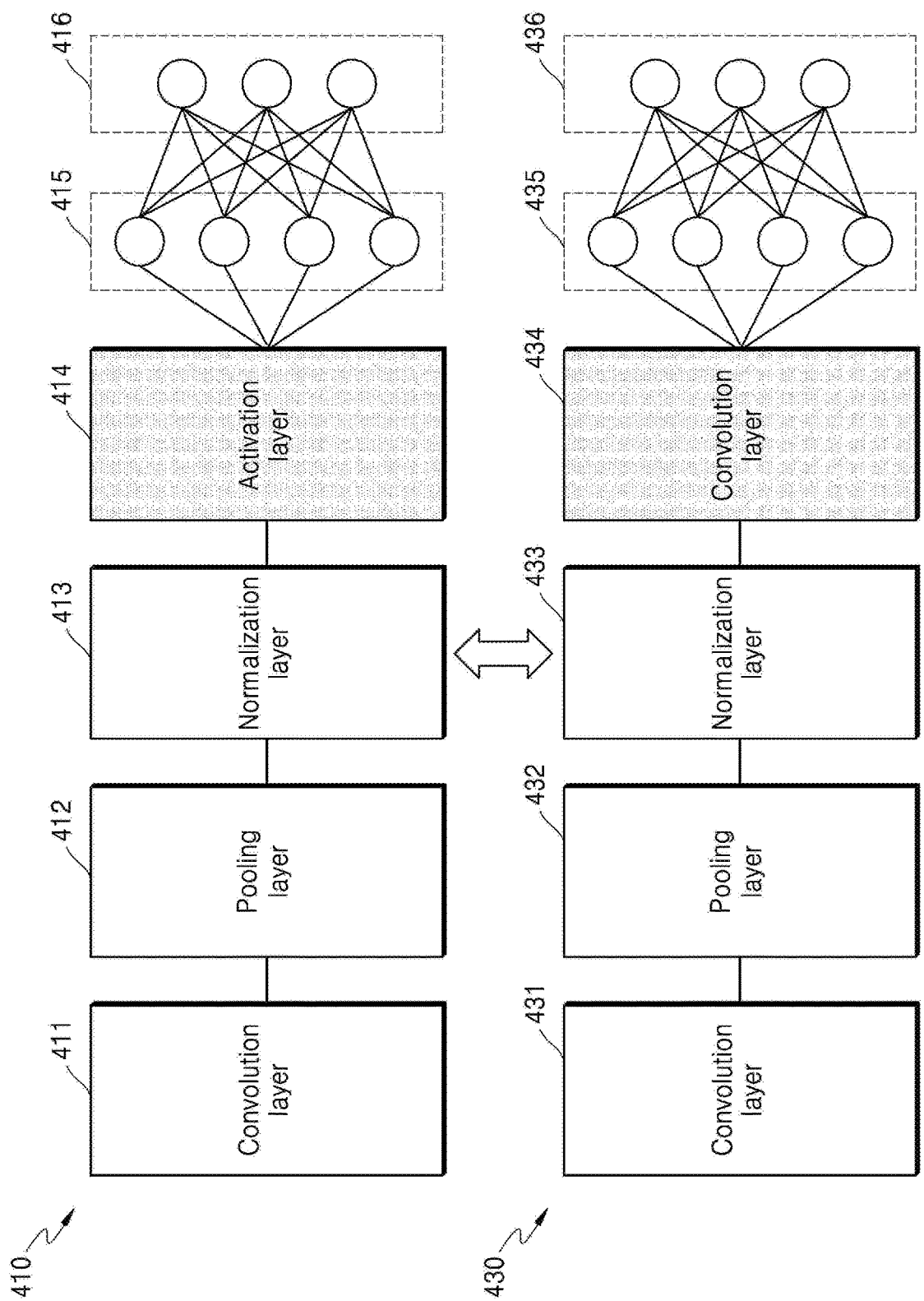
FIG. 4 is diagram for describing a method of determining whether a first neural network and a second neural network structurally correspond to each other.

Referring to FIG. 4, a first neural network 410 may include a convolution layer 411, a pooling layer 412, a normalization layer 413, an activation layer 414, a first fully connected layer (FCL) 415, and a second FCL 416. Also, a second neural network 430 may include a first convolution layer 431, a pooling layer 432, a normalization layer 433, a second convolution layer 434, a first FCL 435, and a second FCL 436.

The term 'convolution layer' may refer to a layer that uses a convolution operation to extract desired characteristics from data, and the term 'pooling layer' may refer to a layer for reducing a spatial resolution of a feature map. Also, the term 'normalization layer' may refer to a layer that normalizes a range of input data, and the term 'activation layer' may refer to a layer that applies non-linear characteristics to an output result of a previous layer. Also, the term fully connected layer (FCL) may refer to a layer that includes at least one node, processes data input to the at least one node, and transmits the data to a next layer. Each node included in the FCL may be connected all nodes included in a previous FCL or a subsequent FCL.

The types and numbers of layers of FIG. 4 are merely examples, and the first neural network 410 and the second neural network 430 may include various types and various numbers of layers.

Referring to FIG. 4, types of first layers (i.e., 411 and 431) through third layers (i.e., 413 and 433) and fifth layers (i.e., 415 and 435) and sixth layers (i.e., 416 and 436) of the first neural network 410 and the second neural network 430 are the same. Because types of fourth layers (i.e., 414 and 434) that are respectively an activation layer and a convolution layer are different from each other, the central processing device 150 may determine that the first neural network 410 and the second neural network 430 do not structurally correspond to each other. As described below, because types of the first layers (i.e., 411 and 431) through the third layers (i.e., 413 and 433) of the first neural network 410 and the second neural network 430 are the same, the central processing device 150 may determine the first layers (i.e., 411 and 431) through the third layers (i.e., 413 and 433) as a common neural network, which will be described with reference to FIG. 10. Alternatively, because the types of first layers (i.e., 411 and 431) through third layers (i.e., 413 and 433) and fifth layers (i.e., 415 and 435) and sixth layers (i.e., 416 and 436) of the first neural network 410 and the second neural network 430 are the same, the central processing device 150 may determine the first layers (i.e., 411 and 431) through third layers (i.e., 413 and 433) and fifth layers (i.e., 415 and 435) and sixth layers (i.e., 416 and 436) as a common neural network.

In an embodiment of the disclosure, when types of layers are the same, it may mean that types of operations (e.g., convolution operation, pooling operation, and activation operation) performed on input data are the same and specific arithmetic operation methods are the same. In other words, when two convolution layers perform the same type of operation, but use different arithmetic operation methods, it may be determined that two neural networks including the two convolution layers do not correspond to each other. Alternatively, when two convolution layers perform the same type of operation, but use different arithmetic operation methods to obtain a same result, it may be determined that two neural networks including the two convolution layers correspond to each other.

Figure 5:
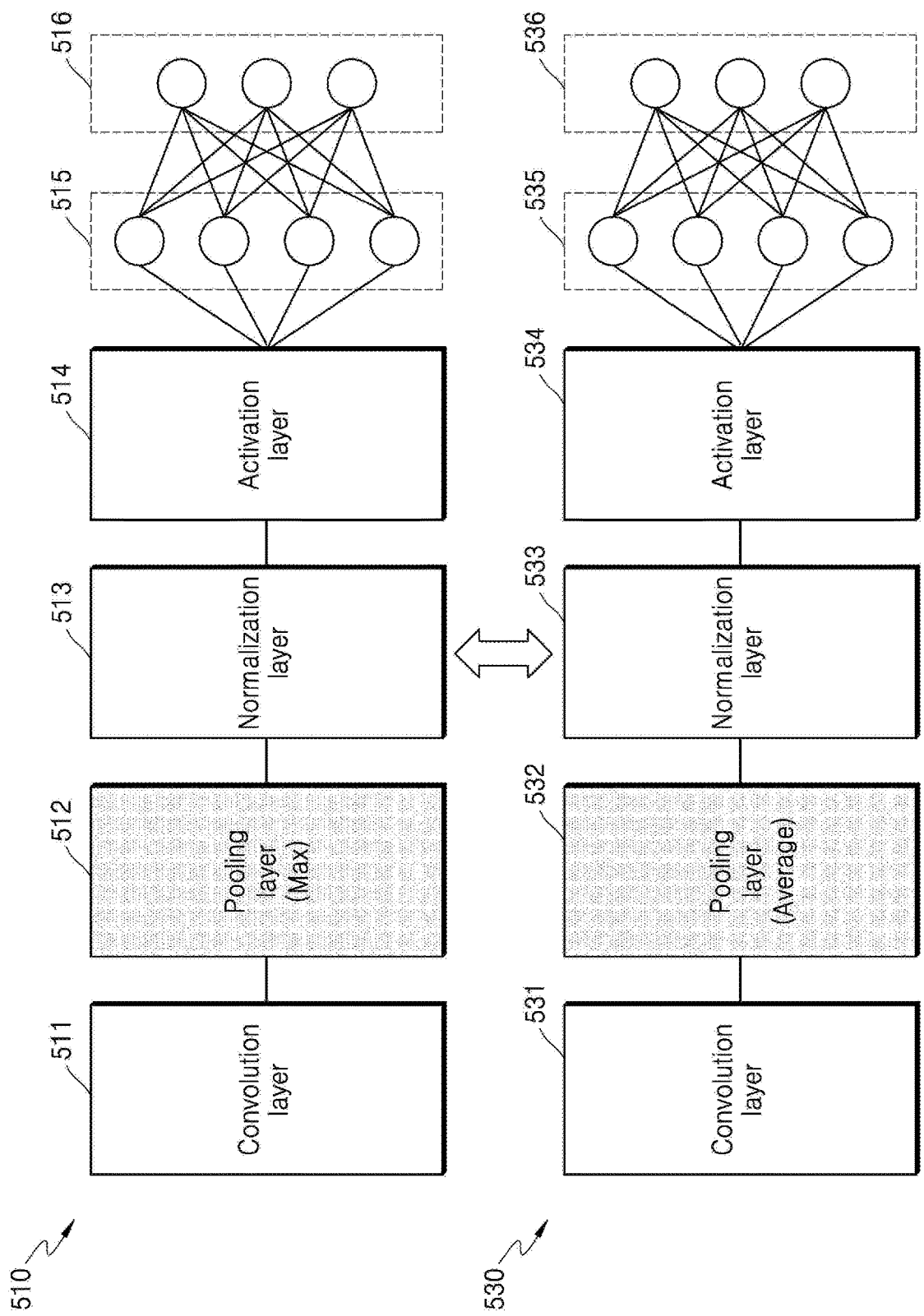
FIG. 5 is diagram for describing a method of determining whether a first neural network and a second neural network structurally correspond to each other.

Referring to FIG. 5, although a first neural network 510 and a second neural network 530 include convolution layers 511 and 531, pooling layers 512 and 532, normalization layers 513 and 533, activation layers 514 and 534, first FCLs 515 and 535, and second FCLs 516 and 536, when the pooling layer 512 of the first neural network 510 performs a max pooling operation and the pooling layer 532 of the second neural network 530 performs an average pooling operation, the central processing device 150 may determine that the first neural network 510 and the second neural network 530 do not structurally correspond to each other.

Figure 6:
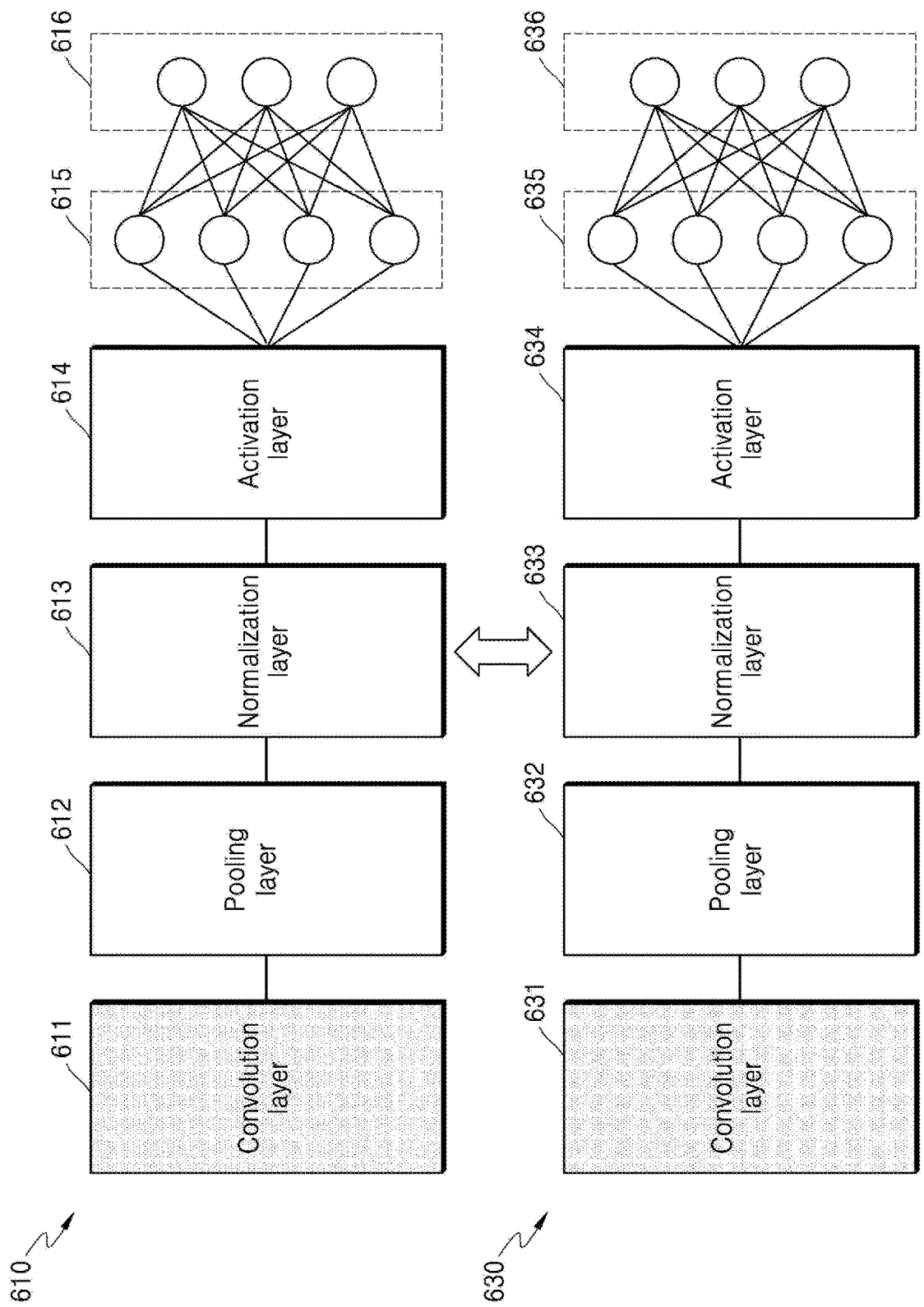
FIG. 6 is diagram for describing a method of determining whether a first neural network and a second neural network structurally correspond to each other.

Also, referring to FIG. 6, although a first neural network 610 and a second neural network 630 include convolution layers 611 and 631, pooling layers 612 and 632, normalization layers 613 and 633, activation layers 614 and 634, first FCLs 615 and 635, and second FCLs 616 and 636, when respective arithmetic operation methods of the convolution layer 611 of the first neural network 610 and the convolution layer 631 of the second neural network 630 are different from each other, the central processing device 150 may determine that the first neural network 610 and the second neural network 630 do not structurally correspond to each other.

Figure 7:
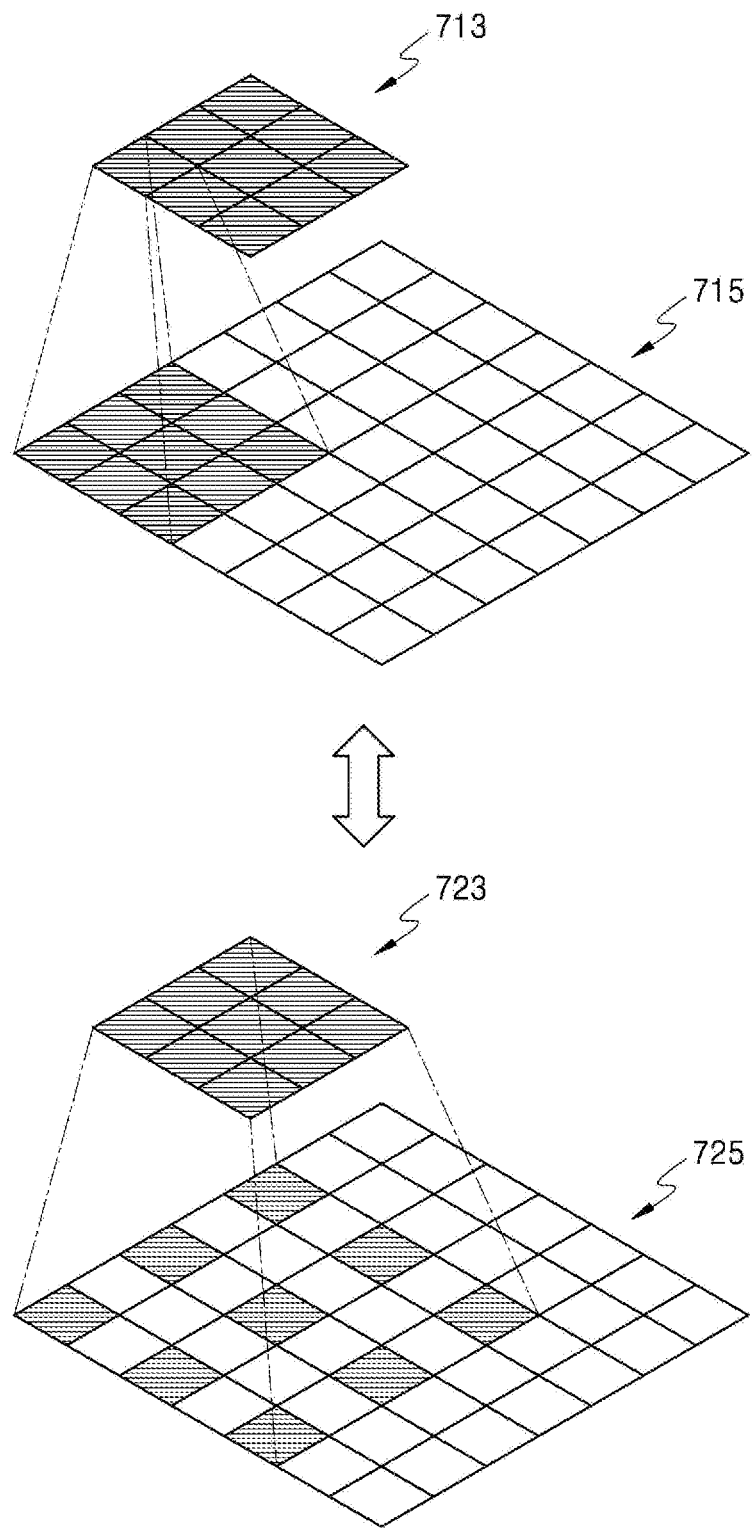
FIG. 7 is diagram for describing a method of determining whether a first neural network and a second neural network structurally correspond to each other.

For example, referring to FIG. 7, when the convolution layer 611 of the first neural network 610 is a general convolution layer that performs convolution on a predetermined number of pixel values that are adjacent to one another from among input data 715 by using a filter kernel 713 and the convolution layer 631 of the second neural network 630 is a dilated convolution layer that performs convolution on a predetermined number of pixel values that are spaced apart from one another from among input data 725 by using a filter kernel 723, the central processing device 150 may determine that the first neural network 610 and the second neural network 630 do not structurally correspond to each other.

Figure 8:
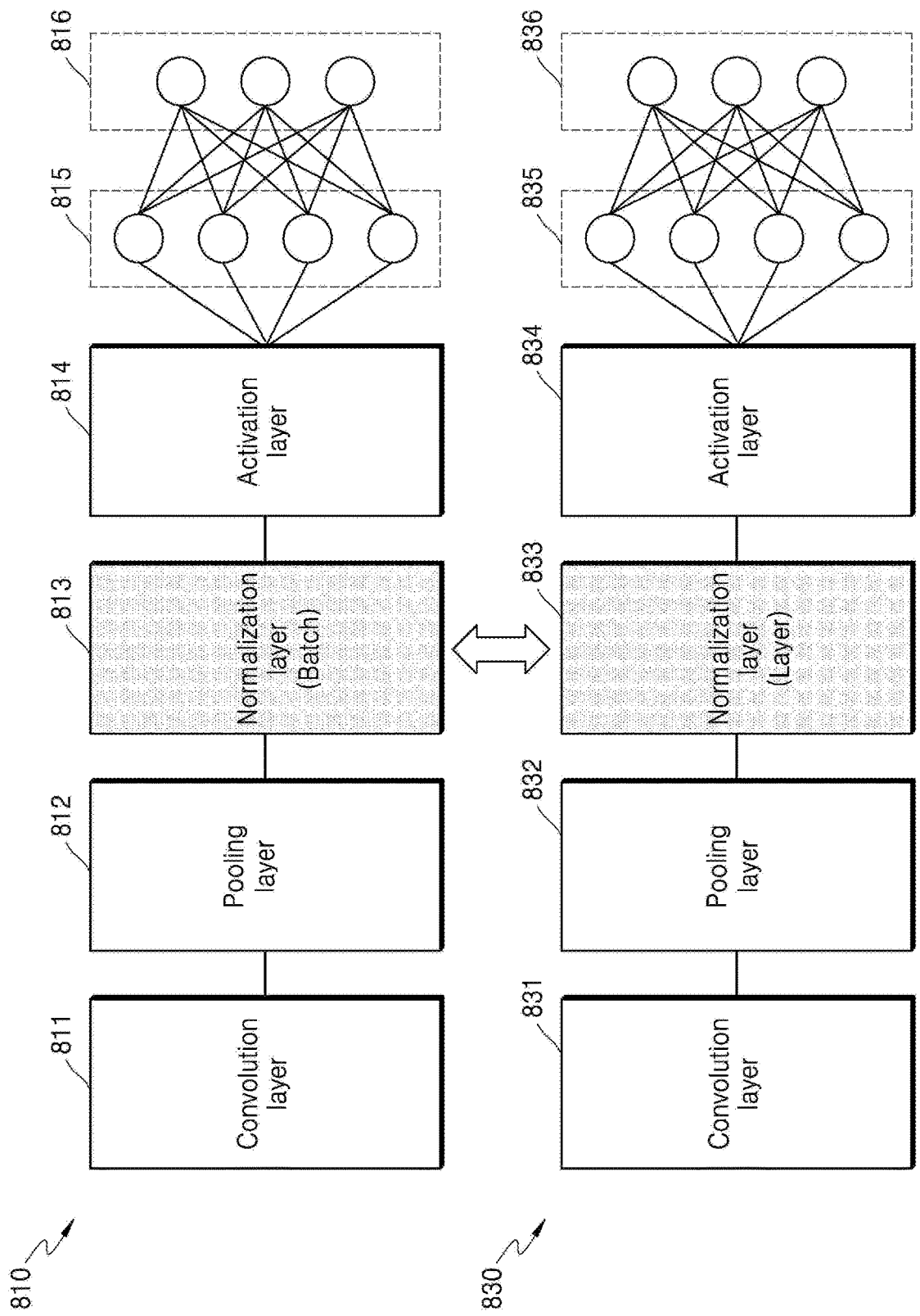
FIG. 8 is diagram for describing a method of determining whether a first neural network and a second neural network structurally correspond to each other.

Also, referring to FIG. 8, although a first neural network 810 and a second neural network 830 include convolution layers 811 and 831, pooling layers 812 and 832, normalization layers 813 and 833, activation layers 814 and 834, first FCLs 815 and 835, and second FCLs 816 and 836, when the normalization layer 813 of the first neural network 810 performs a batch normalization operation and the normalization layer 833 of the second neural network 830 performs a layer normalization operation, the central processing device 150 may determine that the first neural network 810 and the second neural network 830 do not structurally correspond to each other.

In an embodiment of the disclosure, when connection relations between layers included in a first neural network and a second neural network are the same, the central processing device 150 may determine that the first neural network and the second neural network structurally correspond to each other.

Figure 9:
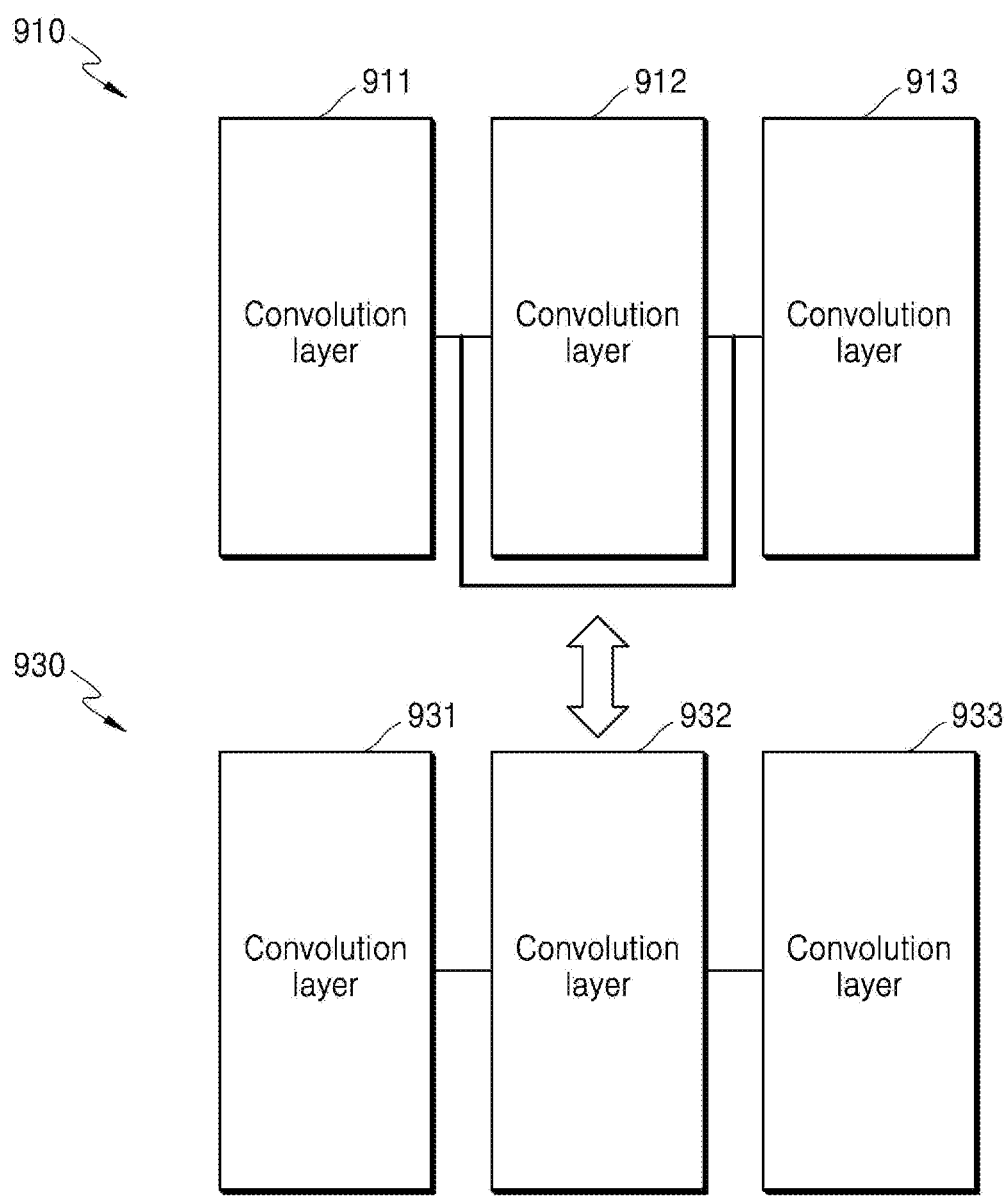
FIG. 9 is diagram for describing a method of determining whether a first neural network and a second neural network structurally correspond to each other.

Referring to FIG. 9, when a first neural network 910 and a second neural network 930 include first convolution layers 911 and 931, second convolution layers 912 and 932, and third convolution layers 913 and 933, because the first neural network 910 has a skip connection structure in which an output of the first convolution layer 911 is simultaneously input to the second convolution layer 912 and the third convolution layer 913 whereas the second neural network 930 has a structure in which an output of the first convolution layer 931 is only input to the second convolution layer 932, the central processing device 150 may determine that the first neural network 910 and the second neural network 930 do not structurally correspond to each other.

In an embodiment of the disclosure, when types of layers included in a first neural network and a second neural network and connection relations between the layers are the same, the central processing device 150 may determine whether the first neural network and the second neural network structurally correspond to each other by considering whether sizes of input data of the each layer included in the first neural network and the second neural network are the same and sizes of output data of the each layer included in the first neural network and the second neural network are the same. When the sizes of the input data and the sizes of the output data are the same, dimensions of the input data and dimensions of the output data are the same and numbers of data corresponding to the dimensions are the same. For example, when numbers of two pieces of one-dimensional data are the same, sizes of the two pieces of one-dimensional data are the same. Also, when numbers of horizontal data and vertical data between two pieces of two-dimensional data are the same, sizes of the two pieces of two-dimensional data are the same. Also, when numbers of horizontal data, vertical data, and depth data between two pieces of three-dimensional data are the same, sizes of the two pieces of three-dimensional data are the same. Also, when numbers of horizontal data, vertical data, depth data, and batches between two pieces of four-dimensional data are the same, sizes of the two pieces of four-dimensional data are the same.

For example, when a first neural network and a second neural network whose layer types and interlayer interconnections are the same each include three layers, the central processing device 150 may determine that the first neural network and the second neural network structurally correspond to each other when sizes of input/output data of first layers, sizes of input/output data of second layers, and sizes of input/output data of third layers included in the first neural network and the second neural network are the same.

In an embodiment of the disclosure, the central processing device 150 may determine whether layers structurally correspond to each other according to different standards according to types of layers included in the first neural network and the second neural network.

For example, when a first neural network and a second neural network commonly include FCLs and numbers of nodes included in the FCLs are the same, the central processing device 150 may determine that the first neural network and the second neural network structurally correspond to each other. For example, because a second FCL 1016 that is a sixth layer of a first neural network 1010 includes three nodes whereas a second FCL 1036 of a second neural network 1030 includes four nodes in FIG. 10, the central processing device 150 may determine that the first neural network 1010 and the second neural network 1030 do not structurally correspond to each other.

Also, for example, when a first neural network and a second neural network commonly include convolution layers and numbers of filter kernels, sizes of the filter kernels, strides, and padding sizes of the convolution layers are the same, the central processing device 150 may determine that the first neural network and the second neural network structurally correspond to each other. The term 'filter kernel' may refer to a parameter for finding features of an image, and the term 'stride' may refer to a distance by which the filter kernel moves for input data. Also, the term 'padding' may refer to increasing a size of the input data by allocating a preset pixel value (e.g., 0) to outside of the input data, and the term 'padding size' may correspond to the number of pixel lines added to the outside of the input data. For example, when one line of pixels are added along upper side, right side, lower side, and left side of input data, a padding size may correspond to 1.

Also, for example, when a first neural network and a second neural network commonly include pooling layers and sizes of filter kernels, strides, and padding sizes of the pooling layers are the same, the central processing device 150 may determine that the first neural network and the second neural network structurally correspond to each other. The term 'filter kernel' may refer to a filter that specifies some input data used to reduce a spatial resolution of input data, and the term 'stride' may refer to a distance by which the filter kernel moves. Also, the term 'padding' may refer to increasing a size of the input data by allocating a preset pixel value to outside of the input data, and the term 'padding size' may correspond to the number of pixel lines added to the outside of the input data.

In an embodiment of the disclosure, when only some layers from among layers included in a first neural network and a second neural network correspond to each other, the central processing device 150 may determine only those matching layers that structurally correspond to each other as a common neural network, and may store remaining layers of the first neural network and remaining layers of the second neural network as individual neural networks, components, or layers in the auxiliary storage device 110. For example, when some layers of a first neural network structurally correspond to some layers of a second neural network, the central processing device 150 may divide a first neural network file into a first sub-file including the corresponding layers and a second sub-file including remaining layers, may store the first sub-file as a common neural network in the auxiliary storage device 110, and may store the second sub-file as an individual neural network in the auxiliary storage device 110. Next, although the first sub-file determined as the common neural network is commonly used to execute a first application program and a second application program, the second sub-file may be loaded into the main storage device 130 only when the first application program is executed. Also, the central processing device 150 may divide a second neural network file into a first sub-file including the corresponding layers and a second sub-file including remaining layers, and may remove the first sub-file from the auxiliary storage device 110, and may store the second sub-file as an individual neural network in the auxiliary storage device 110. The second sub-file may be loaded into the main storage device 130 only when the second application program is executed.

Figure 10:
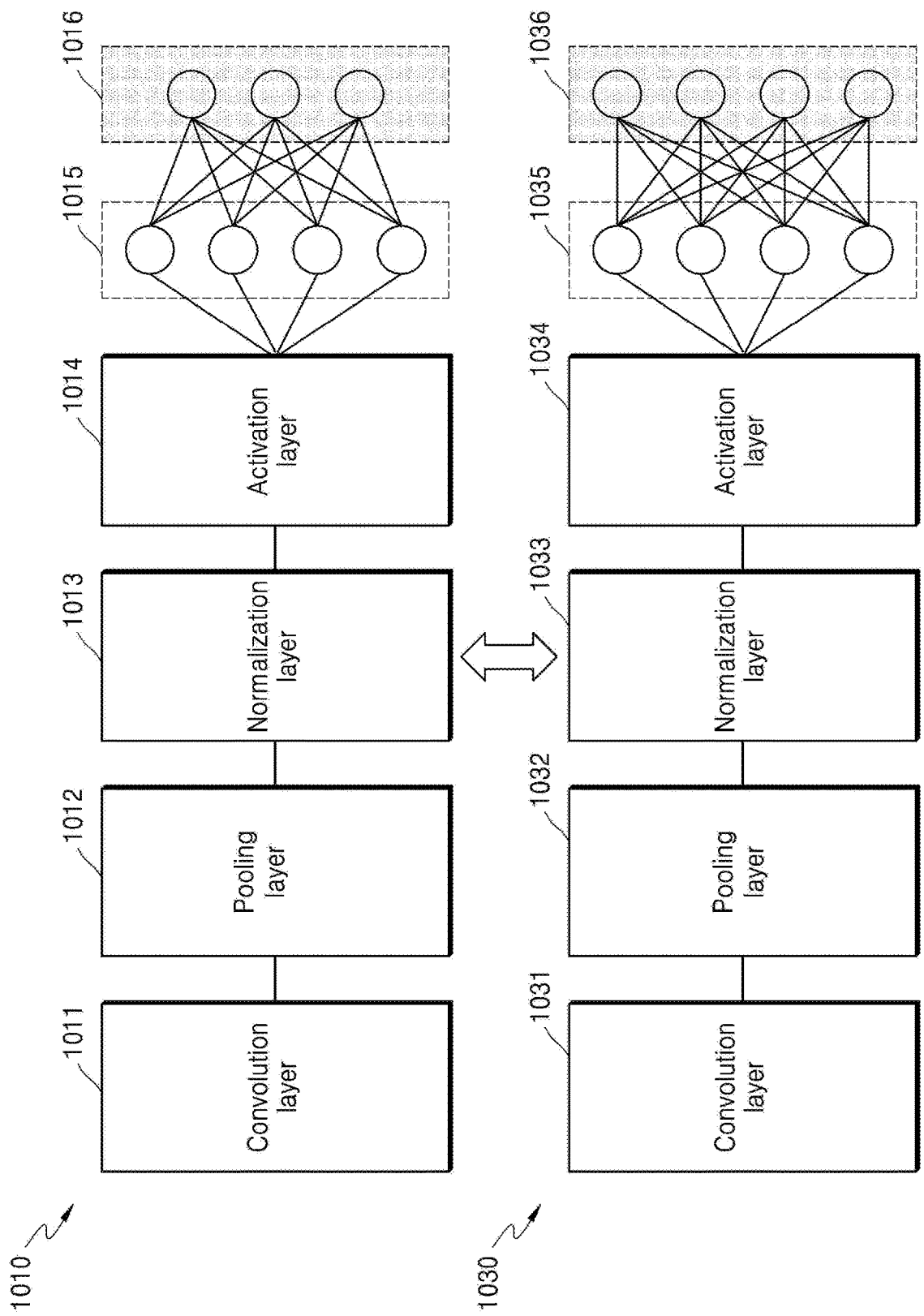
FIG. 10 is diagram for describing a method of determining whether a first neural network and a second neural network structurally correspond to each other.

Referring to FIG. 10, because first layers (i.e., 1011 and 1031) through fifth layers (i.e., 1015 and 1035) of the first neural network 1010 and the second neural network 1030 structurally correspond to each other, the central processing device 150 may determine the first layers (i.e., 1011 and 1031) through the fifth layers (i.e., 1015 and 1035) as a common neural network. The central processing device 150 may store a sixth layer (i.e., 1016) of the first neural network 1010 as an individual neural network of a first application program in the auxiliary storage device 110, and may store a sixth layer (i.e., 1036) of the second neural network 1030 as an individual neural network of a second application program in the auxiliary storage device 110.

When execution of the first neural network 1010 is necessary, the central processing device 150 loads the common neural network and the individual neural network of the first application program into the main storage device 130. Also, when execution of the second neural network 1030 is necessary, the central processing device 150 loads the common neural network and the individual neural network of the second application program into the main storage device 130. In this case, output data of the common neural network may be used as input data of the individual neural network, or output data of the individual neural network may be used as input data of the common neural network.

When at least one common neural network is stored in the auxiliary storage device 110, the central processing device 150 may generate mapping information indicating which application program uses each common neural network. For example, when a common neural network A and a common neural network B are stored in the auxiliary storage device 110, the central processing device 150 may generate and store mapping information indicating that an application program 'a' and an application program 'b' use the common neural network A and an application program 'c' and an application program 'd' use the common neural network B. When executions of a neural network included in the application program 'a' and the application program 'b' are necessary, the central processing device 150 may load the common neural network A to the main storage device 130 based on the pre-generated mapping information, and likewise, when executions of a neural network included in the application program 'c' and the application program 'd' are necessary, the central processing device 150 may load the common neural network B into the main storage device 130 based on the pre-generated mapping information.

Although a method of extracting a common neural network according to whether multiple neural networks structurally correspond to one another has been described, because internal parameters used for internal arithmetic operations of neural networks may be different among the neural networks even after the common neural network is extracted, a method of storing the internal parameters used in the neural networks will be described.

Figure 11:
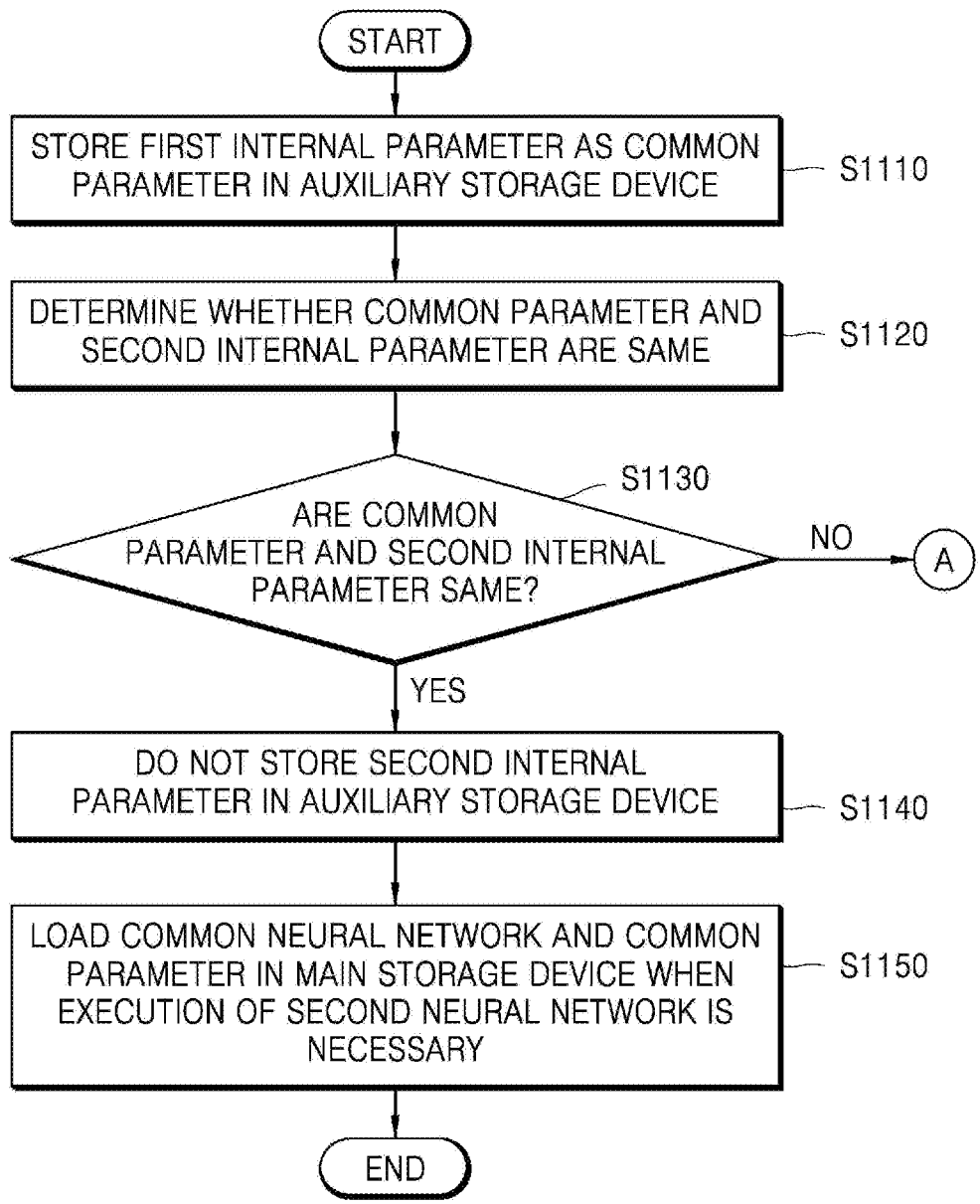
FIG. 11 is a flowchart for describing a method of storing a second internal parameter of a second neural network.
Figure 12:
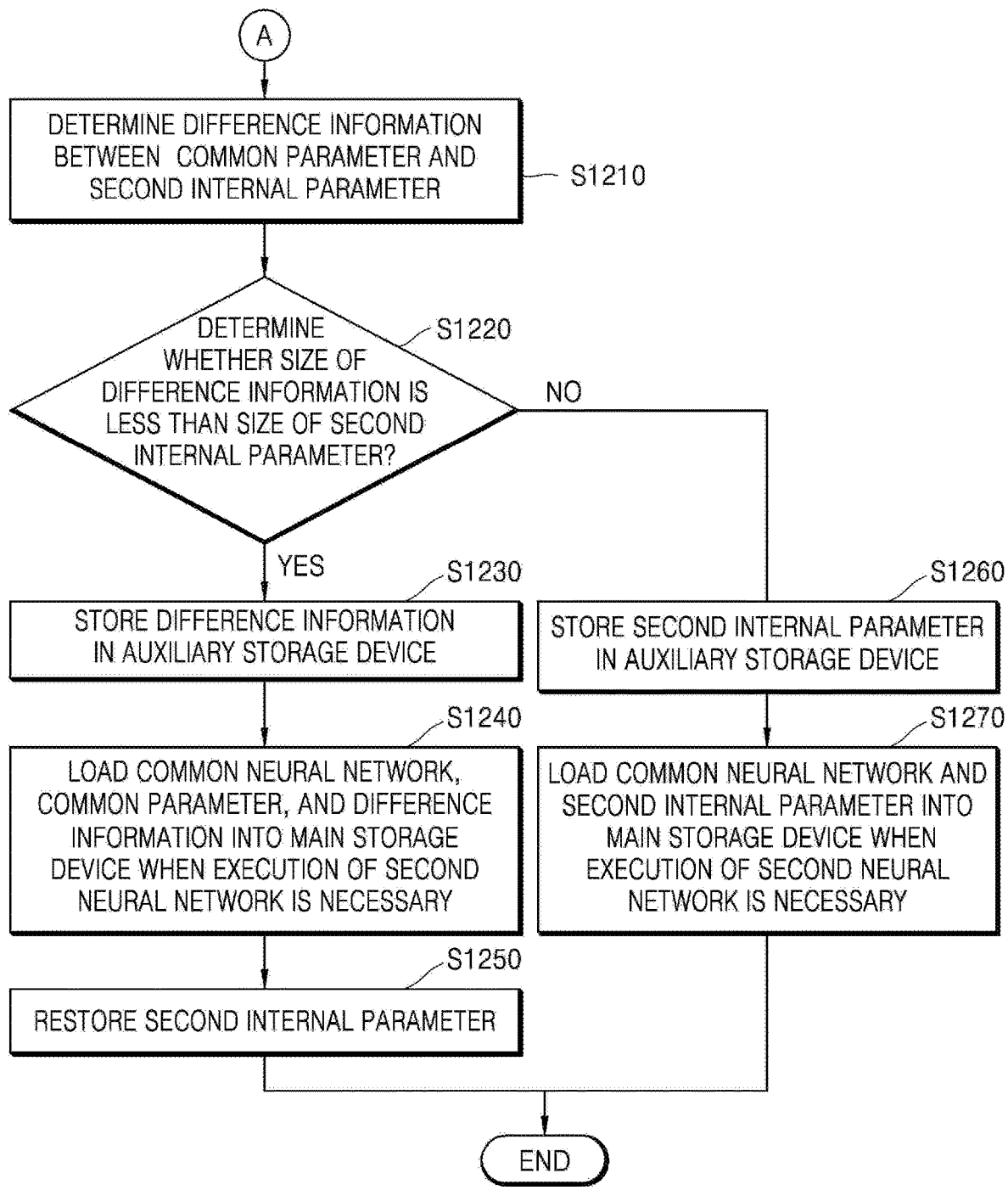
FIG. 12 is a flowchart for describing a method of storing a second internal parameter of a second neural network.

FIGS. 11 and 12 are flowcharts for describing a method of storing a second internal parameter of a second neural network.

When a first neural network and a second neural network structurally correspond to each other and the first neural network is stored as a common neural network in the auxiliary storage device 110, in operation S1110, the central processing device 150 stores a first internal parameter used for a arithmetic operation of each of layers constituting the first neural network as a common parameter in the auxiliary storage device 110. In an embodiment of the disclosure, the first internal parameter may be stored in a first neural network file, or may be stored in a metafile or a separate internal parameter file.

In operation S1120, the central processing device 150 determines whether a second internal parameter used for a arithmetic operation of each of layers constituting the second neural network and the common parameter are the same.

When the common neural network and the second neural network include a plurality of layers, the central processing device 150 may compare the common parameter used in each layer with the second internal parameter in each layer and may determine whether the second internal parameter and the common parameter are the same. For example, when the common neural network and the second neural network include three layers, the central processing device 150 may compare internal parameters used in first layers of the common neural network and the second neural network, may compare internal parameters used in second layers of the common neural network and the second neural network, and may compare internal parameters used in third layers of the common neural network and the second neural network, and may determine whether the second internal parameter and the common parameter are the same.

In an embodiment of the disclosure, when values included in the common parameter and values included in the second internal parameter are the same, the central processing device 150 may determine that the second internal parameter and the common parameter are the same.

When the common parameter and the second internal parameter are the same in operation S1130—YES, in operation S1140, the central processing device 150 does not store the second internal parameter in the auxiliary storage device 110. The central processing device 150 may remove the second internal parameter stored in the auxiliary storage device 110 from the auxiliary storage device 110. For example, the central processing device 150 may not store a second internal parameter file (e.g., a second neural network file, a metafile, or a separate internal parameter file) including information about the second internal parameter in the auxiliary storage device 110 or may remove the second internal parameter file from the auxiliary storage device 110.

In operation S1150, when execution of the second neural network is necessary, the central processing device 150 may load the common neural network and the common parameter into the main storage device 130 and may cause the common neural network to perform an internal arithmetic operation according to the common parameter.

A case in which the common parameter and the second internal parameter are not the same in operation S1130—NO will be described with reference to FIG. 12.

In operation S1210, the central processing device 150 determines difference information between the common parameter and the second internal parameter.

In an embodiment of the disclosure, the central processing device 150 may determine a plurality of pieces of difference information according to a plurality of calculation methods, and then may determine difference information having a smallest data size from among the plurality of pieces of difference information as final difference information.

Figure 13:
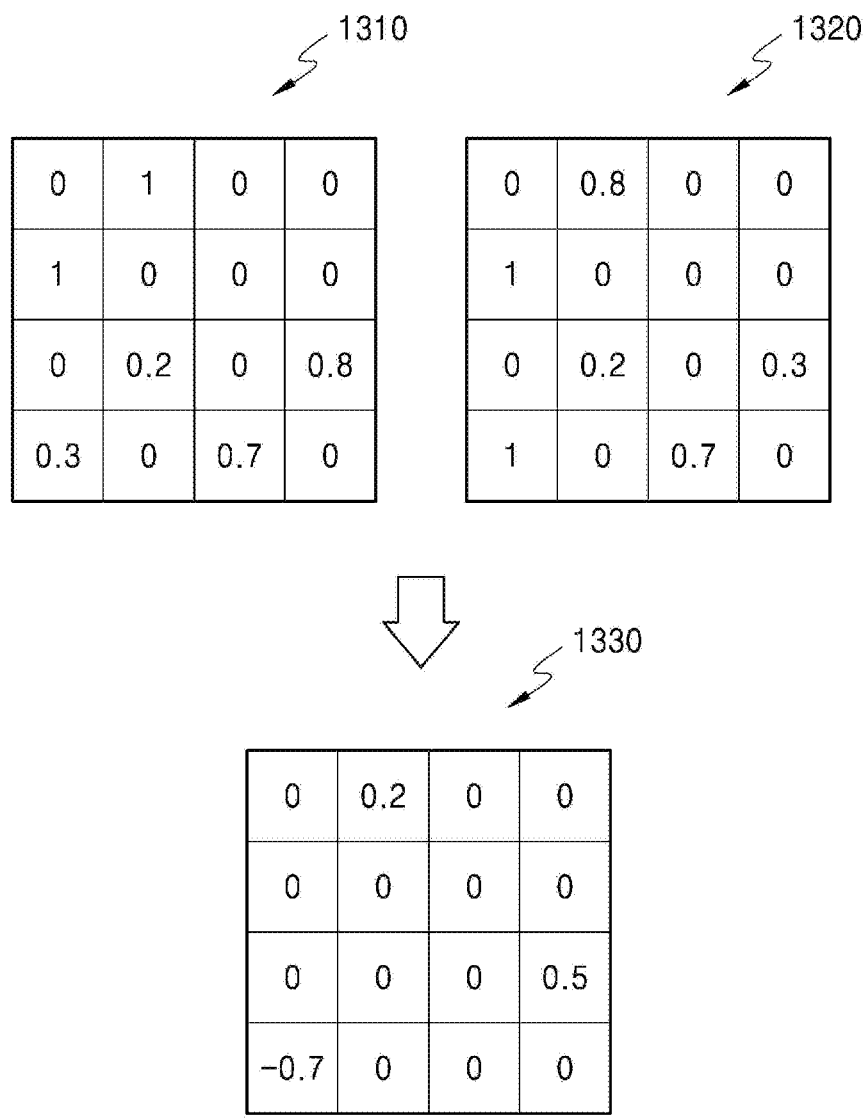
FIG. 13 is a diagram for describing a method of obtaining difference information between a common parameter and a second internal parameter.

One of the plurality of calculation methods may be a method of obtaining, as difference information, a residual parameter obtained by subtracting the second internal parameter (or the common parameter) from the common parameter (or the second internal parameter). For example, as shown in FIG. 13, a residual parameter 1330 corresponding to a result obtained by subtracting a second internal parameter 1320 from a common parameter 1310 may be obtained as difference information. In this case, the second internal parameter 1320 may be restored by subtracting the residual parameter 1330 from the common parameter 1310.

Figure 14:
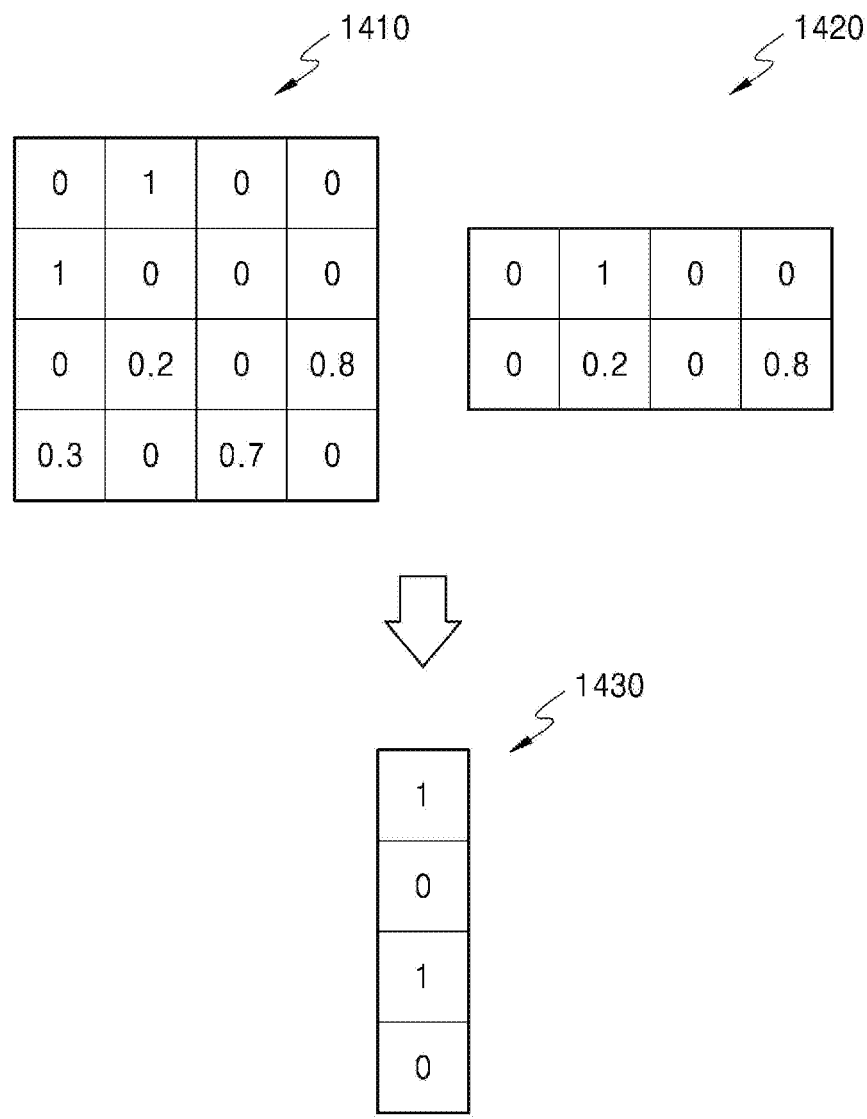
FIG. 14 is a diagram for describing a method of obtaining difference information between a common parameter and a second internal parameter.

Another method may be a method of obtaining, as difference information, a selective parameter for selecting a value belonging to the second internal parameter from among values belonging to the common parameter when the second internal parameter is included in the common parameter. For example, as shown in FIG. 14, because values corresponding to a first row and values corresponding to a third row from among values included in a common parameter 1410 are included in a second internal parameter 1420, a selective parameter 1430 for selecting the first row and the third row in the common parameter 1410 may be obtained as difference information.

Another method may be a method of obtaining, when the second internal parameter may be obtained by multiplying the common parameter by a transformation parameter, the transformation parameter as difference information. For example, when the transformation parameter is T, the second internal parameter may be common parameter ● T.

Another method may be a method of obtaining, when the second internal parameter may be derived by multiplying a result obtained by multiplying a first transformation parameter by the common parameter by a second transformation parameter, the first transformation parameter and the second transformation parameter as difference information. For example, when the first transformation parameter is T1 and the second transformation parameter is T2, the second internal parameter may be T1 ● common parameter ● T2.

Another method may be a method of obtaining, when the second internal parameter may be derived by multiplying the first transformation parameter by the common parameter to obtain a multiplication result, multiplying the multiplication result by the second transformation parameter, and adding a residual parameter, the first transformation parameter, the second transformation parameter, and the residual parameter as difference information. For example, when the first transformation parameter is T1, the second transformation parameter is T2, and the residual parameter is D, the second internal parameter may be T1 ● common parameter ● T2+D.

Referring back to FIG. 12, in operation S1220, the central processing device 150 determines whether a data size of the difference information is less than a data size of the second internal parameter.

When the data size of the difference information is less than the data size of the second internal parameter in operation S1220—YES, in operation S1230, the central processing device 150 stores the difference information in the auxiliary storage device 110, and does not store the second internal parameter in the auxiliary storage device 110. The difference information may be generated as a separate file and may be stored in the auxiliary storage device 110.

In operation S1240, when execution of the second neural network is necessary, the central processing device 150 may load the common neural network, the common parameter, and the difference information into the main storage device 130, and in operation S1250, the central processing device 150 restores the second internal parameter by applying the difference information to the common parameter. Accordingly, the common neural network may function according to the second internal parameter.

When the execution of the second neural network ends, the central processing device 150 may unload the second internal parameter from the main storage device 130, and when the second neural network is executed again, the central processing device 150 may load the common parameter and the difference information into the main storage device 130 and then may restore the second internal parameter.

When the data size of the difference information is not less than the data size of the second internal parameter, that is, when the data size of the difference information is equal to or greater than the data size of the second internal parameter in operation S1220—NO, in operation S1260, the central processing device 150 does not store the difference information in the auxiliary storage device 110 and stores the second internal parameter in the auxiliary storage device 110. When the second internal parameter of the second neural network is stored in the second neural network file as described above, the central processing device 150 may not store the second neural network file in the auxiliary storage device 110 and may store the second internal parameter stored in the second neural network file as a separate file in the auxiliary storage device 110. When the second internal parameter is stored in a metafile or a separate internal parameter file, the central processing device 150 may store the metafile or the separate internal parameter file in the auxiliary storage device 110.

In operation S1270, when execution of the second neural network is necessary, the central processing device 150 may load the common neural network and the second internal parameter into the main storage device 130 and may cause the common neural network to function according to the second internal parameter.

In many cases, application programs installed on mobile devices including smartphones are updated in a short cycle. According to the disclosure, because a neural network included in an application program may be extracted as a common neural network, how the application program is updated in this case will be described with reference to FIGS. 15 through 17.

Figure 15:
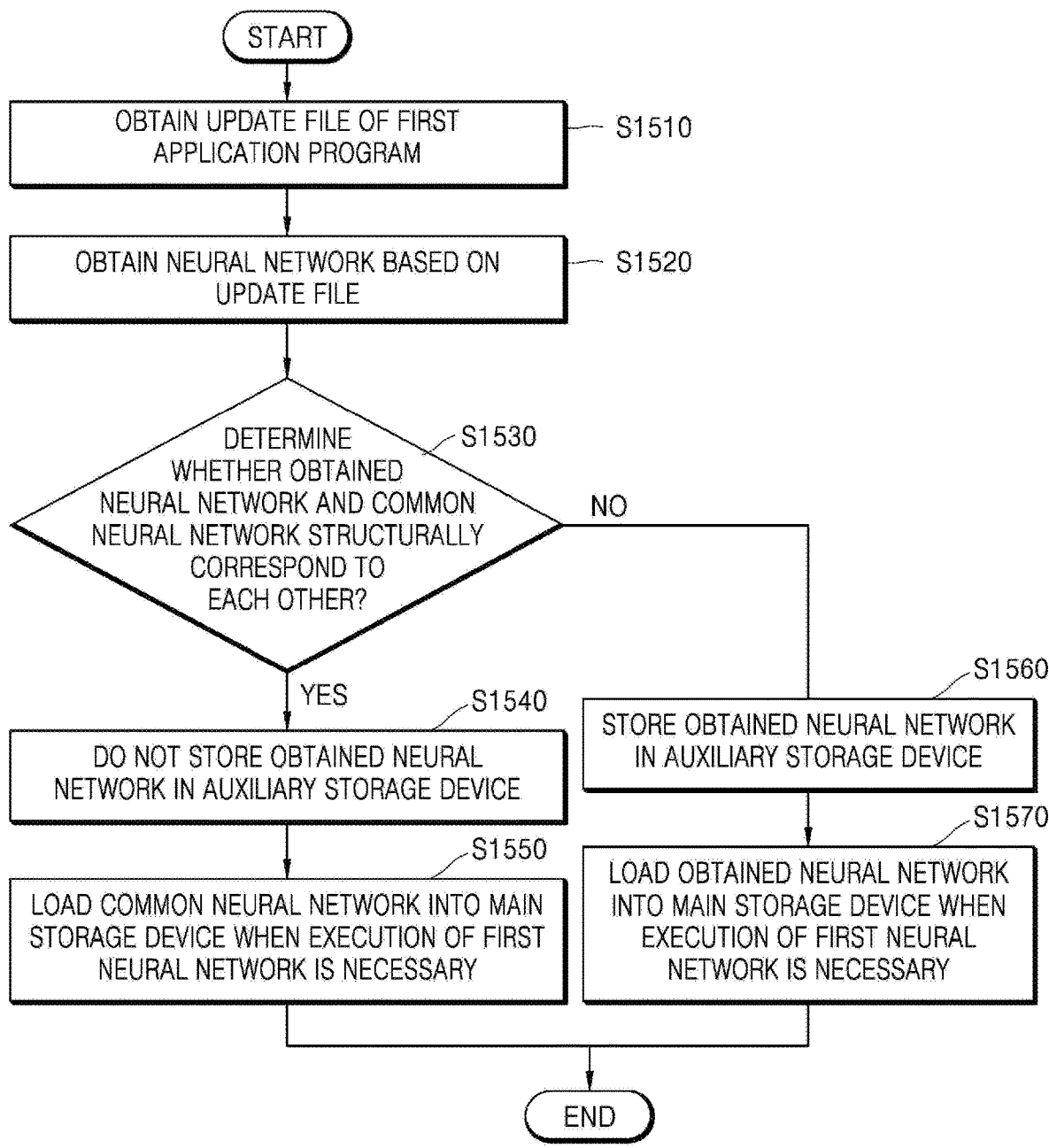
FIG. 15 is a flowchart for describing a method of updating a first application program.
Figure 16:
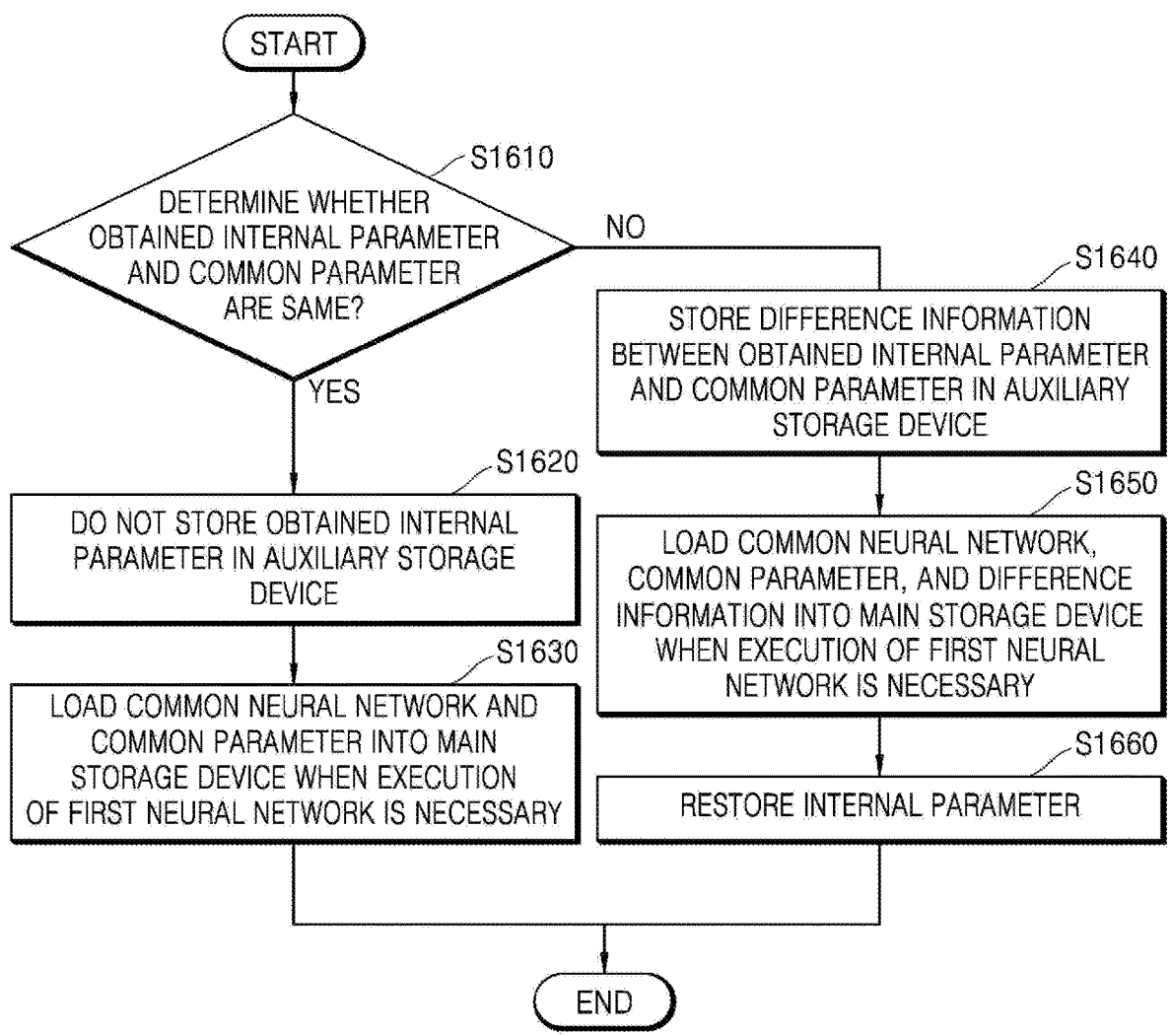
FIG. 16 is a flowchart for describing a method of updating a first application program.
Figure 17:
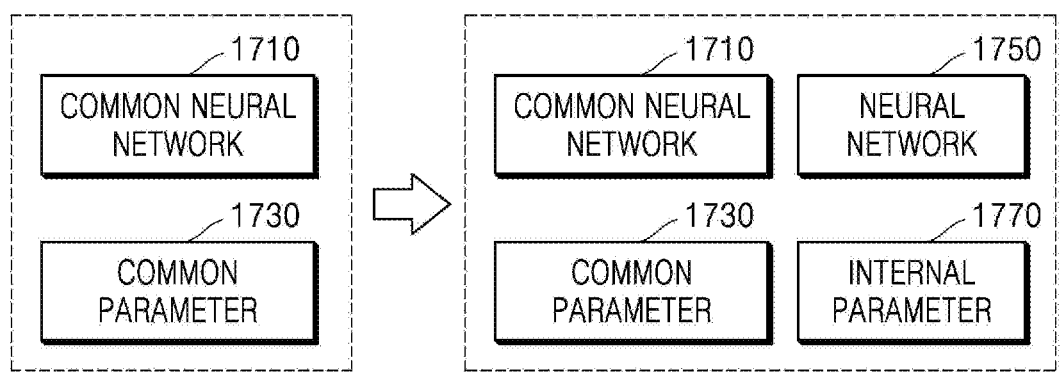
FIG. 17 is a block diagram illustrating a common neural network, a common parameter, a neural network obtained based on an update file, and an internal parameter obtained based on the update file, in relation to the method of updating the first application program.

FIGS. 15 and 16 are flowcharts for describing a method of updating a first application program, and FIG. 17 is a block diagram illustrating a common neural network 1710, a common parameter 1730, a neural network 1750 obtained based on an update file, and an internal parameter 1770 obtained based on the update file in relation to the method of updating the first application program.

In an embodiment of the disclosure, the central processing device 150 may store an update file in a temporary file, and may obtain the neural network 1750 and the internal parameter 1770 by updating the common neural network 1710 and the common parameter 1730 according to a file stored in the temporary folder or may obtain the neural network 1750 and the internal parameter 1770 from a neural network file stored in the temporary folder. In an embodiment of the disclosure, the update file may include a file including information indicating how to update a first application program, for example, difference data of the first application program and an updated first application program, and in this case, the central processing device 150 may obtain the neural network 1750 and the internal parameter 1770 by updating the common neural network 1710 and the common parameter 1730 according to the update file. In an embodiment of the disclosure, the update file may include a new first application profile that is to replace the first application program, and in this case, the central processing device 150 may obtain the neural network 1750 and the internal parameter 1770 from a neural network file in the update file.

Referring to FIGS. 15 and 17, in operation S1510, the central processing device 150 obtains an update file of a first application program. The central processing device 150 may obtain the update file transmitted from an application distribution server to the apparatus 100 or may obtain the update file transmitted through a USB or the like to the apparatus 100.

As described above, a first neural network and a first internal parameter of the first application program are stored as the common neural network 1710 and the common parameter 1730 in the auxiliary storage device 110.

In operation S1520, the central processing device 150 obtains the neural network 1750 based on the update file.

In operation S1530, the central processing device 150 determines whether the neural network 1750 and the common neural network 1710 structurally correspond to each other. The central processing device 150 may determine whether the neural network 1750 and the common neural network 1710 correspond to each other based on, for example, types of layers included in the neural network 1750 and the common neural network 1710, connection relations between the layers, and sizes of input/output data. Determining whether two neural networks structurally correspond to each other has been described above, and thus a redundant explanation thereof is omitted.

When the neural network 1750 and the common neural network 1710 structurally correspond to each other in operation S1530—YES, in operation S1540, the central processing device 150 does not store the neural network 1750 in the auxiliary storage device 110. Files other than a neural network file including the common neural network 1710 from among files constituting the first application program may be updated according to the update file. In operation S1550, when execution of the first neural network is necessary, the central processing device 150 loads the common neural network 1710 into the main storage device 130.

In an embodiment of the disclosure, when only some layers of the neural network 1750 structurally correspond to the common neural network 1710, the central processing device 150 may remove a file corresponding to the corresponding layers from the auxiliary storage device 110, and may store a file corresponding to remaining layers as an individual neural network in the auxiliary storage device 110. Next, when execution of the first neural network is necessary, the central processing device 150 may load the common neural network 1710 and the individual neural network into the main storage device 130.

When the neural network 1750 and the common neural network 1710 do not structurally correspond to each other in operation S1530—NO, in operation S1560, the central processing device 150 stores the neural network 1750 as an individual neural network of the first application program in the auxiliary storage device 110.

In operation S1570, when execution of the first neural network is necessary, the central processing device 150 loads the neural network 1750 stored as the individual neural network into the main storage device 130.

When the common neural network 1710 and the neural network 1750 structurally correspond to each other, the central processing device 150 may determine whether the common parameter 1730 and the internal parameter 1770 obtained according to the update file are the same, which will be described with reference to FIG. 16.

In operation S1610, the central processing device 150 determines whether the internal parameter 1770 obtained based on the update file and the common parameter 1730 are the same.

In operation S1620, when the internal parameter 1770 and the common parameter 1730 are the same in operation S1610—YES, the central processing device 150 does not store the internal parameter 1770 in the auxiliary storage device 110.

In operation S1630, when execution of the first neural network is necessary, the central processing device 150 loads the common neural network 1710 and the common parameter 1730 into the main storage device 130.

In operation S1640, when the internal parameter 1770 and the common parameter 1730 are different from each other in operation S1610—NO, the central processing device 150 stores difference information between the internal parameter 1770 and the common parameter 1730 in the auxiliary storage device 110. As described above, the central processing device 150 may obtain difference information by using various calculation methods, may compare difference information having a smallest data size with a data size of the internal parameter 1770, and may determine whether to store the difference information in the auxiliary storage device 110. When a size of the difference information is not less than a size of the internal parameter 1770, the central processing device 150 may store the internal parameter 1770, instead of the difference information, in the auxiliary storage device 110. When the internal parameter 1770 is stored in a file including the neural network 1750, the central processing device 150 may generate a separate file including the internal parameter 1770 and may store the separate file in the auxiliary storage device 110. When a size of the difference information is not less than a size of the internal parameter 1770 and thus the internal parameter 1770 is stored in the auxiliary storage device 110, the central processing device 150 may load the common neural network 1710 and the internal parameter 1770 into the main storage device 130 when execution of the first neural network is necessary.

In operation S1650, after the difference information is stored in the auxiliary storage device 110, the central processing device 150 loads the common neural network 1710, the common parameter 1730, and the difference information into the main storage device 130 when execution of the first neural network is necessary. In operation S1660, the central processing device 150 restores the internal parameter 1770 by applying the difference information to the common parameter 1730. Accordingly, the common neural network 1710 may function according to the internal parameter 1770.

Although an update file of a second application program using the common neural network 1710 may be obtained and the second application program may be updated as shown in FIGS. 15 and 16, a problem may occur when original difference information between a second internal parameter and the common parameter 1730 is pre-stored in the auxiliary storage device 110.

For example, when a new second internal parameter of the second application program is included in the update file and the new second internal parameter and the common parameter 1730 are not the same, the central processing device 150 determines new difference information between the new second internal parameter and the common parameter 1730. The central processing device 150 may store the new difference information in the auxiliary storage device 110 according to a comparison result obtained by comparing sizes of the new second internal parameter and the new difference information. The original difference information between the second internal parameter and the common parameter 1730 may be removed from the auxiliary storage device 110. Next, when execution of a second neural network is necessary, the central processing device 150 may restore the new second internal parameter by applying the new difference information to the common parameter 1730.

Also, when only difference data between the new second internal parameter and an original second internal parameter is included in the update file, the central processing device 150 first restores the original second internal parameter by applying the original difference information between the common parameter 1730 and the original second internal parameter to the common parameter 1730. The central processing device 150 obtains the new second internal parameter by applying the difference data included in the update file to the original second internal parameter. When the new second internal parameter and the common parameter 1730 are not the same, the central processing device 150 determines new difference information between the new second internal parameter and the common parameter 1730. The central processing device 150 may store the new difference information in the auxiliary storage device 110 according to a comparison result obtained by comparing sizes of the new second internal parameter with the new difference information. Next, when execution of the second neural network is necessary, the central processing device 150 may restore the new second internal parameter by applying the new difference information to the common parameter 1730.

Figure 18:
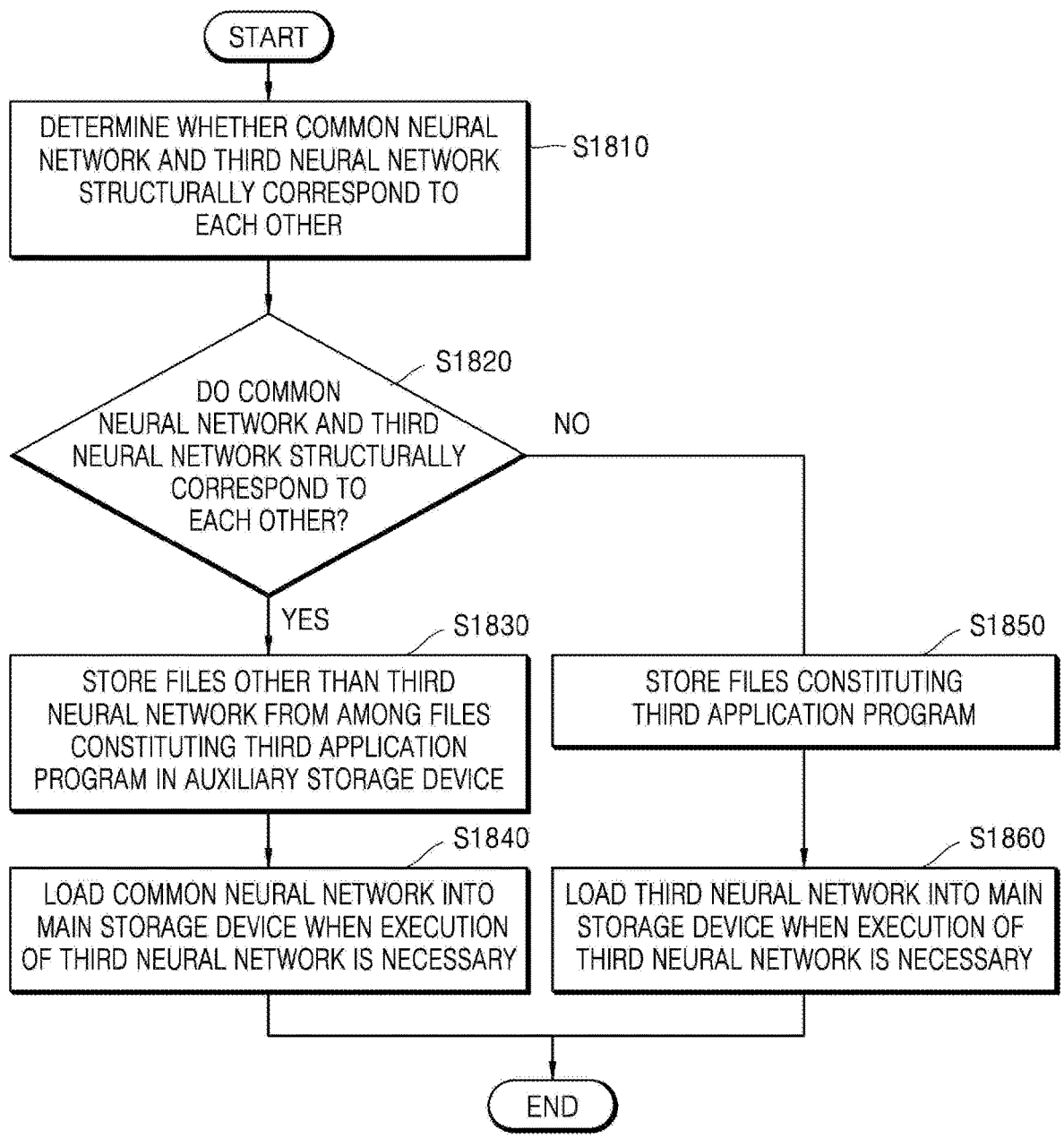
FIG. 18 is a flowchart illustrating a method of managing an application program, according to another embodiment of the disclosure.

FIG. 18 is a flowchart illustrating a method of managing an application program according to an embodiment of the disclosure.

Although FIG. 3 illustrates a case in which a first application program and a second application program are installed on the apparatus 100 and then a common neural network is extracted, FIG. 18 illustrates a case where, in a state in which a common neural network is pre-stored in the auxiliary storage device 110, a third application program including a third neural network is installed on the apparatus 100.

In operation S1810, the central processing device 150 determines whether a common neural network and a third neural network structurally correspond to each other.

The central processing device 150 may determine whether the common neural network and the third neural network structurally correspond to each other based on, for example, types of layers constituting the neural networks and connection relations.

When the common neural network and the third neural network structurally correspond to each other in operation S1820—YES, in operation S1830, the central processing device 150 may store files other than the third neural network form among files constituting a third application program in the auxiliary storage device 110. The central processing device 150 may not store a third neural network file from among the files constituting the third application program in the auxiliary storage device 110.

In operation S1840, when execution of the third neural network is necessary and the common neural network is not loaded into the main storage device 130, the central processing device 150 may load the common neural network into the main storage device 130.

When the common neural network and the third neural network do not structurally correspond to each other in operation S1820—NO, in operation S1850, the central processing device 150 stores the files constituting the third application program in the auxiliary storage device 110. When the common neural network and the third neural network do not structurally correspond to each other, because the common neural network may not be used to execute the third application program, all of the files constituting the third application program are stored in the auxiliary storage device 110.

In an embodiment of the disclosure, when the common neural network and the third neural network do not structurally correspond to each other, before the files constituting the third application program are stored in the auxiliary storage device 110, the central processing device 150 may determine that a new common neural network may be extracted by comparing structures of the third neural network with a neural network of a pre-stored application program (e.g., a first application program and a second application program). A method of determining whether to extract the new common neural network by comparing the structure of the third neural network with the structure of the neural network of the pre-stored application program is the same as that described with reference to FIG. 3, and thus a redundant explanation thereof is omitted. When the third neural network and the neural network of the pre-stored application program structurally correspond to each other, the neural network of the pre-stored application program may be stored as a common neural network in the auxiliary storage device 110, and the files other than the third neural network from among the files constituting the third application program may be stored in the auxiliary storage device 110.

After all of the files constituting the third application program are stored in the auxiliary storage device 110, in operation S1860, when execution of the third neural network is necessary, the central processing device 150 may load the third neural network stored as an individual neural network into the main storage device 130.

When it is determined that the common neural network and the third neural network structurally correspond to each other in operation S1820, the central processing device 150 may determine whether a common parameter and a third internal parameter of the third neural network are the same, and may determine whether to store the third internal parameter in the auxiliary storage device 110 or whether to store difference information between the common parameter and the third internal parameter in the auxiliary storage device 110 as described above. Next, when execution of the third neural network is necessary, the central processing device 150 may load the common neural network, the common parameter, and the difference information into the main storage device 130 or may load the common neural network and the third internal parameter into the main storage device 130.

The embodiments of the disclosure may be implemented as a computer-executable program or instructions, and the program may be stored in a medium or a computer program product.

The medium or the computer program product may continuously store the computer-executable program, or may temporarily store the computer-executable program to execute or download the computer-executable program. Also, the medium or the computer program product may be any of various recording means or storage means including a single hardware or a combination of a plurality of hardware, and may be distributed in a network without being limited to a medium directly connected to a computer system. The medium or the computer program product may be configured to store program instructions, and examples of the medium may include a magnetic medium such as a hard disk, a floppy disk, or a magnetic tape, an optical recording medium such as a CD-ROM or a DVD, a magneto-optical medium such as a floptical disk, a ROM, a RAM, and a flash memory. Other examples of the medium or the computer program product may include a recording medium and a storage medium managed by an application store that distributes applications or a site or a server that supplies or distributes various other software.

An apparatus and method for managing an application program according to an embodiment of the disclosure may reduce a data size of the application program stored in a device.

Also, an apparatus and method for managing an application program according to an embodiment of the disclosure may reduce a size of data loaded into a main storage device to execute the application program.

However, effects that can be achieved by an apparatus and method for managing an application program according to an embodiment of the disclosure are not limited thereto, and other effects would have been easily understood by one of ordinary skill in the art from the description.

While the disclosure has been particularly shown and described with reference to embodiments thereof, it will be understood by one of ordinary skill in the art that various changes in form and details may be made therein without departing from the spirit and scope of the disclosure as defined by the following claims.

What is claimed is:

1. An apparatus for managing an application program, the apparatus comprising:
 a memory; and
 at least one processor, wherein the at least one processor is configured to:
   control the memory to store a common neural network utilized by a first application program installed on the apparatus to process first data of the first application program and utilized by a second application program installed on the apparatus to process second data of the second application program;

based on execution of the first application program:
utilize a first mapping information to process the first data of the first application program linked to the common neural network for performing feature extraction on the first data of the first application program, and a first layer of a first neural network for classifying the first data based on the feature extraction, and obtain a first execution result of the first application program processing the first data based on the common neural network and the first layer, and based on execution of the second application program:
utilize a second mapping information to process the second data of the second application program linked to the common neural network for performing feature extraction on the second data of the second application program, and a second layer of a second neural network for classifying the second data based on the feature extraction, and obtain a second execution result of the second application program processing the second data based on the common neural network and the second layer, wherein the at least one processor is further configured to:
generate the first mapping information indicating that the first application program is linked to the common neural network and the second mapping information indicating that the second application program is linked to the common neural network, and load the common neural network based on the first mapping information or the second mapping information when the first application program or the second application program is executed.

2. The apparatus of claim 1, wherein the at least one processor controls the memory to store first files constituting the first application program, and second files constituting the second application program other than one or more second neural network files, the one or more second neural network files being for implementing the second neural network that corresponds to the common neural network.

3. The apparatus of claim 1, wherein the at least one processor is further configured to:
obtain first structure information of the first neural network from a first metafile included in the first application program;
obtain second structure information of the second neural network from a second metafile included in the second application program; and
determine the common neural network by comparing the first structure information of the first neural network with the second structure information of the second neural network.

4. The apparatus of claim 3, wherein the first structure information comprises first types of layers included in the first neural network and first connection relations between the layers included in the first neural network, and
wherein the second structure information comprises second types of layers included in the second neural network and second connection relations between the layers included in the second neural network.

5. The apparatus of claim 3, wherein the first structure information comprises first sizes of first input data and first output data of layers included in the first neural network, and
wherein the second structure information comprises second sizes of second input data and second output data of layers included in the second neural network.

6. The apparatus of claim 3, wherein the first structure information comprises first numbers of nodes per layer included in first fully connected layers of the first neural network, and
wherein the second structure information comprises second numbers of nodes per layer included in second fully connected layers of the second neural network.

7. The apparatus of claim 3, wherein the first structure information comprises first convolution layers and first numbers of first filter kernels of the first neural network, first sizes of the first filter kernels of the first neural network, and first strides of the first convolution layers of the first neural network, and
wherein the second structure information comprises second convolution layers and second numbers of second filter kernels of the second neural network, second sizes of the second filter kernels of the second neural network, and second strides of the second convolution layers of the second neural network.

8. The apparatus of claim 3, wherein the first structure information comprises first pooling layers and first sizes of first filter kernels of the first neural network and first strides of the first pooling layers of the first neural network, and
wherein the second structure information comprises second pooling layers and second sizes of second filter kernels of the second neural network and second strides of the second pooling layers of the second neural network.

9. The apparatus of claim 1, wherein the at least one processor is further configured to:
store a first internal parameter used to process the first data in the first neural network of the first application program as a common parameter in the memory,
determine that the common parameter is not the same as a second internal parameter used to process the second data in the second neural network of the second application program,
determine difference information between the common parameter and the second internal parameter, and
store the difference information in the memory.

10. The apparatus of claim 9, wherein the at least one processor is further configured to:
restore the second internal parameter, and
determine at least one of a residual parameter added to the common parameter, a transformation parameter multiplied by the common parameter, or a selective parameter for selecting a part of the common parameter as the difference information.

11. The apparatus of claim 9, wherein the at least one processor is further configured to:
determine a plurality of pieces of difference information between the common parameter and the second internal parameter according to a plurality of calculation methods, and
store difference information having a smallest data size from among the plurality of pieces of difference information in the memory.

12. The apparatus of claim 1, wherein the at least one processor is further configured to:
store a first internal parameter used to process the first data in the first neural network of the first application program as a common parameter in the memory,
determine that the common parameter is not the same as a second internal parameter used to process the second data in the second neural network of the second application program, determine difference information between the common parameter and the second internal parameter, and determine whether to store the difference information in the memory, based on a result obtained by comparing a size of the difference information with a size of the second internal parameter.

13. The apparatus of claim 9, wherein the at least one processor is further configured to:

when the second application program is executed, restore the second internal parameter from the common parameter based on the difference information, and load the second internal parameter into the memory.

14. The apparatus of claim 1, wherein the at least one processor is further configured to:

obtain update data related to the first neural network of the first application program, obtain a third neural network corresponding to the update data, determine that the third neural network and the common neural network do not structurally correspond to each other, and store the third neural network as an individual neural network of the first application program in the memory.

15. The apparatus of claim 14, wherein the at least one processor is further configured to:

determine that the third neural network and the common neural network structurally correspond to each other, determine a common parameter and an internal parameter obtained based on the update data that are not the same, and store difference information between the common parameter and the internal parameter in the memory.

16. The apparatus of claim 15, wherein the at least one processor is further configured to, when the third neural network and the common neural network structurally correspond to each other, not store the third neural network in the memory.

17. The apparatus of claim 1, wherein the common neural network structurally corresponds to some layers of the first neural network of the first application program and some layers of the second neural network of the second application program.

18. The apparatus of claim 1, wherein the first execution result and the second execution result are different each other.

* * * * *